United States Patent
Fujita et al.

(10) Patent No.: US 9,826,295 B2
(45) Date of Patent: Nov. 21, 2017

(54) ACOUSTIC DEVICE AND HEADREST

(71) Applicant: Delta Tooling Co., Ltd., Hiroshima-shi (JP)

(72) Inventors: Etsunori Fujita, Higashihiroshima (JP); Yumi Ogura, Higashihiroshima (JP); Seiji Kawasaki, Higashihiroshima (JP); Shinichiro Maeda, Hatsukaichi (JP); Kosuke Aoi, Hiroshima (JP); Tatsuya Motoie, Aki-gun (JP)

(73) Assignee: DELTA TOOLING CO., LTD., Hiroshima-shi (JP)

( * ) Notice: Subject to any disclaimer, the term of this patent is extended or adjusted under 35 U.S.C. 154(b) by 0 days.

(21) Appl. No.: 15/035,156

(22) PCT Filed: Nov. 11, 2014

(86) PCT No.: PCT/JP2014/079864
§ 371 (c)(1),
(2) Date: May 6, 2016

(87) PCT Pub. No.: WO2015/068852
PCT Pub. Date: May 14, 2015

(65) Prior Publication Data
US 2016/0255430 A1   Sep. 1, 2016

(30) Foreign Application Priority Data

Nov. 11, 2013 (JP) .................................. 2013-233578
Dec. 7, 2013 (JP) .................................. 2013-253712

(51) Int. Cl.
*B60R 11/00* (2006.01)
*H04R 1/28* (2006.01)
(Continued)

(52) U.S. Cl.
CPC ........... *H04R 1/025* (2013.01); *B60N 2/4876* (2013.01); *B60R 11/0217* (2013.01);
(Continued)

(58) Field of Classification Search
CPC .... H04R 1/025; H04R 1/2803; H04R 1/2807; H04R 17/08; H04R 1/02; H04R 1/34;
(Continued)

(56) References Cited

U.S. PATENT DOCUMENTS 5,333,202 A * 7/1994 Okaya .................... H04S 1/002
                                                                352/11
5,387,026 A * 2/1995 Matsuhashi .............. A47C 7/72
                                                                297/217.4
(Continued)

FOREIGN PATENT DOCUMENTS

JP    2004-200761 A    7/2004
JP    2005-223630 A    8/2005
(Continued)

OTHER PUBLICATIONS

Ozturk et al., "A Study on the Influence of Fabric Structure on Sound Absorption Behavior of Spacer Knitted Structers", TEXSCI, Sep. 6-8, 2010, whole document.*

(Continued)

*Primary Examiner* — Sonia Gay
(74) *Attorney, Agent, or Firm* — Oblon, McClelland, Maier & Neustadt, L.L.P.

(57) ABSTRACT

To enable an output sound of a speaker unit to be output as a surface sound source in a limited space. A three-dimensional knitted fabric is provided at a position substantially facing speaker units while being given tension in a surface direction. Since the tension is applied, a pair of ground knitted fabrics constituting the three-dimensional knitted fabric and a connecting yarn extending back and forth (Continued)

between the ground knitted fabrics vibrate due to their elastic action. In particular, string vibration is generated in the connecting yarn. Due to this vibration, output sounds of the speaker units are propagated in the surface direction of the three-dimensional knitted fabric, and as a result, the three-dimensional knitted fabric propagates and radiates acoustic waves of a surface sound source.

13 Claims, 23 Drawing Sheets

(51) Int. Cl.
    *H04R 1/34*     (2006.01)
    *H04R 1/10*     (2006.01)
    *B60N 2/48*     (2006.01)
    *B60R 11/02*     (2006.01)
    *H04R 5/02*     (2006.01)
    *H04R 1/02*     (2006.01)

(52) U.S. Cl.
    CPC ........... *H04R 1/2803* (2013.01); *H04R 5/023* (2013.01); *B60R 2011/0017* (2013.01); *H04R 1/2807* (2013.01); *H04R 1/345* (2013.01); *H04R 2499/13* (2013.01)

(58) Field of Classification Search
    CPC .. H04R 2499/13; H04R 5/023; B60N 2/4876; B60R 11/0217; B60R 2011/0017
    See application file for complete search history.

(56) References Cited

U.S. PATENT DOCUMENTS

| | | | | |
|---|---|---|---|---|
| 7,819,480 | B2* | 10/2010 | Asbury | A47C 7/38 297/391 |
| 2003/0201659 | A1* | 10/2003 | Yasuda | B60N 2/4228 297/216.13 |
| 2004/0237599 | A1* | 12/2004 | Kondou | D04B 1/18 66/202 |
| 2006/0061190 | A1* | 3/2006 | Fukuda | B60N 2/686 297/440.1 |
| 2009/0067657 | A1* | 3/2009 | Yasushi | H04R 5/023 381/333 |
| 2010/0148550 | A1* | 6/2010 | Kidd | B60N 2/4876 297/217.4 |
| 2013/0228392 | A1 | 9/2013 | Iwata et al. | |

FOREIGN PATENT DOCUMENTS

| | | |
|---|---|---|
| JP | 3115815 U | 11/2005 |
| JP | 2008-144291 A | 6/2008 |
| JP | 2009-247388 A | 10/2009 |
| WO | 2013/011699 A1 | 1/2013 |

OTHER PUBLICATIONS

International Search Report dated Feb. 17, 2015 in PCT/JP14/079864 filed Nov. 11, 2014.

* cited by examiner (a)

(b)

(c)

ACOUSTIC DEVICE AND HEADREST

TECHNICAL FIELD

The present invention relates to an acoustic device and a headrest including the acoustic device.

BACKGROUND ART

Patent Document 1 discloses the following headrest. Specifically, it includes: a substantially rectangular parallelepiped member forming a skeletal frame of the headrest; a pad member disposed on a front surface side of the substantially rectangular parallelepiped member; first net members disposed on the left and right of a front surface side of the pad member; a slab member is disposed between the left and right first net members; and a surface member covering the left and right first net members, the slab member, and so on.

The substantially rectangular parallelepiped member forming the skeletal frame of the headrest includes: a panel member disposed on its front surface side; and a box-shaped cover member in whose front surface opening the panel member is fit. In an inner space covered by the panel member and the cover member, a pair of left and right speakers are disposed. Further, in the panel member, the pad member, and the surface member, at portions located in front of sound output parts of the speakers, through holes are formed to allow sound to pass therethrough. Therefore, sounds from the speakers are output to the outside through these through holes and the first net members.

PRIOR ART DOCUMENT

Patent Document

Patent Document 1: Japanese Patent Application Laid-open No. 2009-247388

SUMMARY OF THE INVENTION

Problem to be Solved by the Invention

In the structure of the headrest of Patent Document 1, the speakers are merely disposed in the headrest, and in order to pass the sounds or the like from the speakers, the through holes are simply provided at the corresponding portions. In more detail, in order to prevent the speakers as finished products being sound output devices from being damaged by a load applied to the headrest in normal usage, the panel member and the cover member surround and protect the speakers, while the through holes are provided in order to output the sounds to the outside, further in order to prevent part of the head from sinking in the through holes, the first net members are provided, and in addition, in order to ensure a more comfortable support feeling, the slab member is provided so that no step is made between the left and right first net members.

The first net members of Patent Document 1 only have a function of preventing the head from sinking in the through holes and are simply disposed in the state of being sandwiched between the surface member and the pad member. Further, the first net members only prevent the head from sinking in the through holes, and their meshes have to be formed large enough for the sounds which have been output from the speakers and have passed through the through holes to pass as they are (refer to paragraph "0019" of Patent Document 1). Accordingly, the output sounds from point sound sources being the speakers are only propagated as they are. That is, the presence/absence of the first net members has no influence on a way the output sounds propagate. On the other hand, many of ordinary stereo speakers are surface sound sources that are advantageous for reproduction of bass sound, but it is very difficult in terms of space to dispose a predetermined number of speaker units or more in a limited space of the headrest so that the speaker units become surface sound sources.

The present invention was made in consideration of the above, and has an object to provide an acoustic device capable of outputting, as a surface sound source, an output sound of a speaker unit in a limited space, and a headrest using the same.

Means for Solving the Problems

In order to solve the aforesaid problem, an acoustic device of the present invention includes a speaker unit and a three-dimensional knitted fabric, wherein the three-dimensional knitted fabric is provided at a position substantially facing the speaker unit while being given tension in a surface direction, and an output sound of the speaker unit is converted to an acoustic wave of a surface sound source by vibration of yarns constituting a pair of ground knitted fabrics constituting the three-dimensional knitted fabric and by vibration of a connecting yarn extending back and forth between the ground knitted fabrics, and the acoustic wave is propagated to an outside.

Preferably, the three-dimensional knitted fabric is disposed in a tense state so as to be elongated in the surface direction by a 20% extent or less. At least one of: fabrics including a knitted fabric, a woven fabric, and a non-woven fabric that are two dimensional or three dimensional; synthetic leather; genuine leather; a synthetic resin film; and a bead foam can be combined with the three-dimensional knitted fabric.

Preferably, a plate-shaped bead foam having a predetermined area is combined with the three-dimensional knitted fabric, the three-dimensional knitted fabric is disposed in the tense state so as to correspond to a hole portion formed at a position, of the bead foam, substantially facing the speaker unit, and the bead foam, the hole portion, and the three-dimensional knitted fabric serve as a resonance part which vibrates air inside the hole portion to make the output sound of the speaker unit resonate.

A non-propagating part not allowing the acoustic wave of the surface sound source to propagate can be formed in the three-dimensional knitted fabric, and the non-propagating part can be formed by a process of bringing the pair of ground knitted fabrics constituting the three-dimensional knitted fabric into proximity to each other.

Preferably, the three-dimensional knitted fabric also has a function as a cushioning layer that elastically supports a portion of a human body, and is used as part of a body support means. The body support means can be a seat or bedding, and the three-dimensional knitted fabric can be used as part of the cushioning layer constituting the seat or the bedding. Preferably, in the seat, the three-dimensional knitted fabric is used in part of the headrest.

Further, a headrest of the present invention is characterized in that the above-described acoustic device is incorporated in the headrest. In this case, preferably, the three-dimensional knitted fabric also has a function as a cushioning layer that elastically supports a head.

Effect of the Invention

According to the present invention, the three-dimensional knitted fabric is provided at the position substantially facing at least the speaker unit while given the tension in the surface direction. Since the three-dimensional knitted fabric is given the tension, the pair of ground knitted fabrics constituting the three-dimensional knitted fabric and the connecting yarn extending back and forth between the ground knitted fabrics vibrate due to their elastic action. String vibration is generated especially in the connecting yarn. Due to this vibration, the output sound of the speaker unit is propagated in the surface direction of the three-dimensional knitted fabric, and as a result the three-dimensional knitted fabric propagates and radiates the acoustic wave of the surface sound source. Therefore, even if the speaker unit is a single speaker unit, the three-dimensional knitted fabric functions as the surface sound source since the three-dimensional knitted fabric is disposed to substantially face the speaker unit while given the tension in the surface direction, and therefore, the acoustic device is suitable for being used in a narrow region. Further, the three-dimensional knitted fabric functioning as the surface sound source has a high cushioning function even if it is of a thin type. Therefore, it is usable as the cushioning layer of the body support means such as a seat and bedding, and is suitable as an acoustic device incorporated in the body support means. It is especially suitable for manufacturing an acoustic device-equipped headrest.

The three-dimensional knitted fabric can be used in the state where it is combined with at least one of: fabrics including a knitted fabric, a woven fabric, and a non-woven fabric that are two dimensional or three dimensional; synthetic leather; genuine leather; a synthetic resin film; and a bead foam, but a preferable structure is that the three-dimensional knitted fabric is used with the bead foam having the hole portion at a predetermined position and the three-dimensional knitted fabric is disposed in the tense state on the hole portion. Consequently, the output sound of the speaker unit causes the vibration in the three-dimensional knitted fabric (in particular, causes the string vibration in the connecting yarn), and also causes membrane vibration in the bead foam, and is radiated into the hole portion, to thereby vibrate the air in the hole portion to resonate. As a result, even with the compact structure, it is possible to propagate the acoustic wave of the surface sound source with a higher sound pressure level owing to the resonance.

MODES FOR CARRYING OUT THE INVENTION

Figure 1:
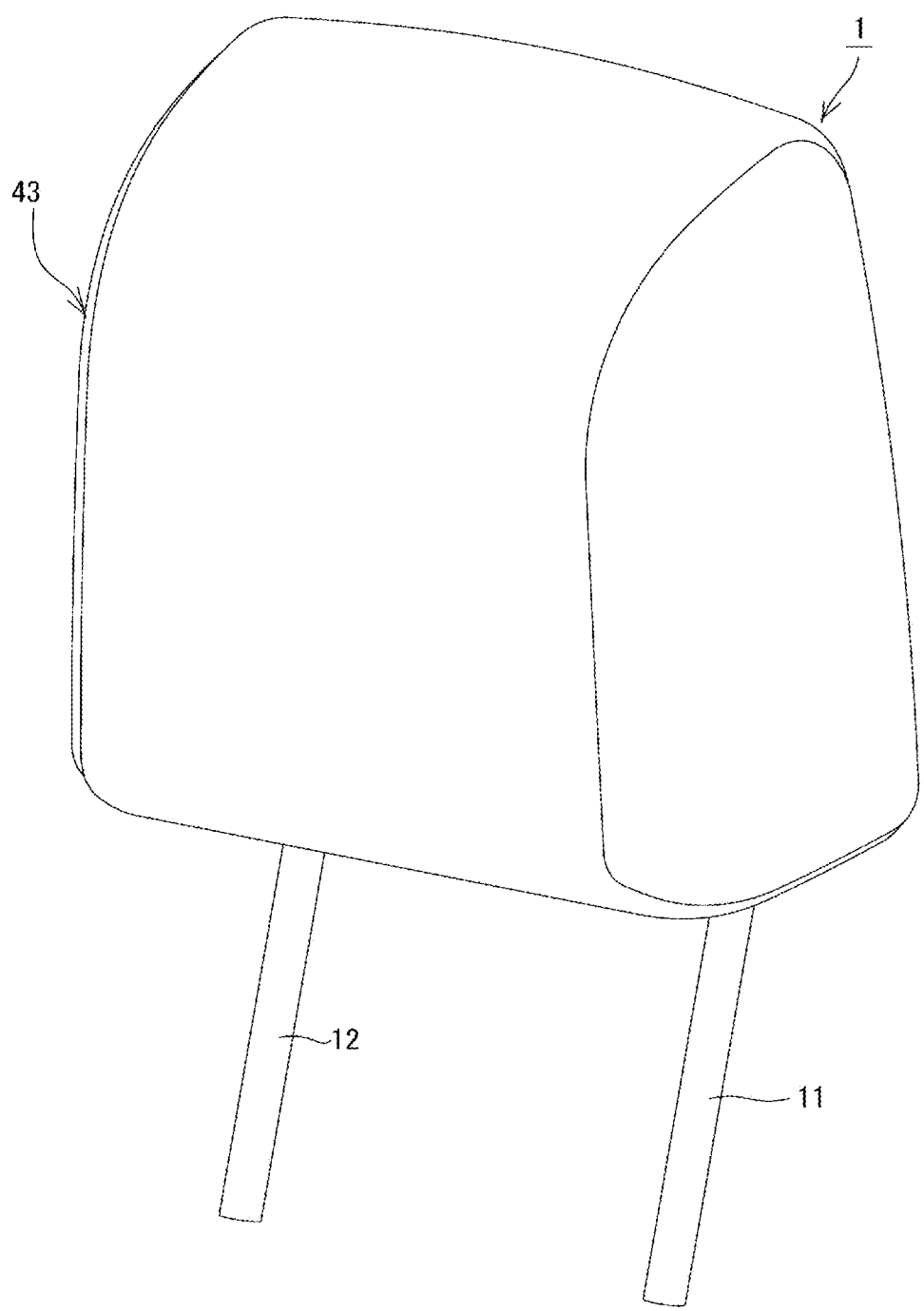
FIG. 1 is a perspective view illustrating an external appearance of a headrest in which an acoustic device according to one embodiment of the present invention is incorporated.
Figure 2:
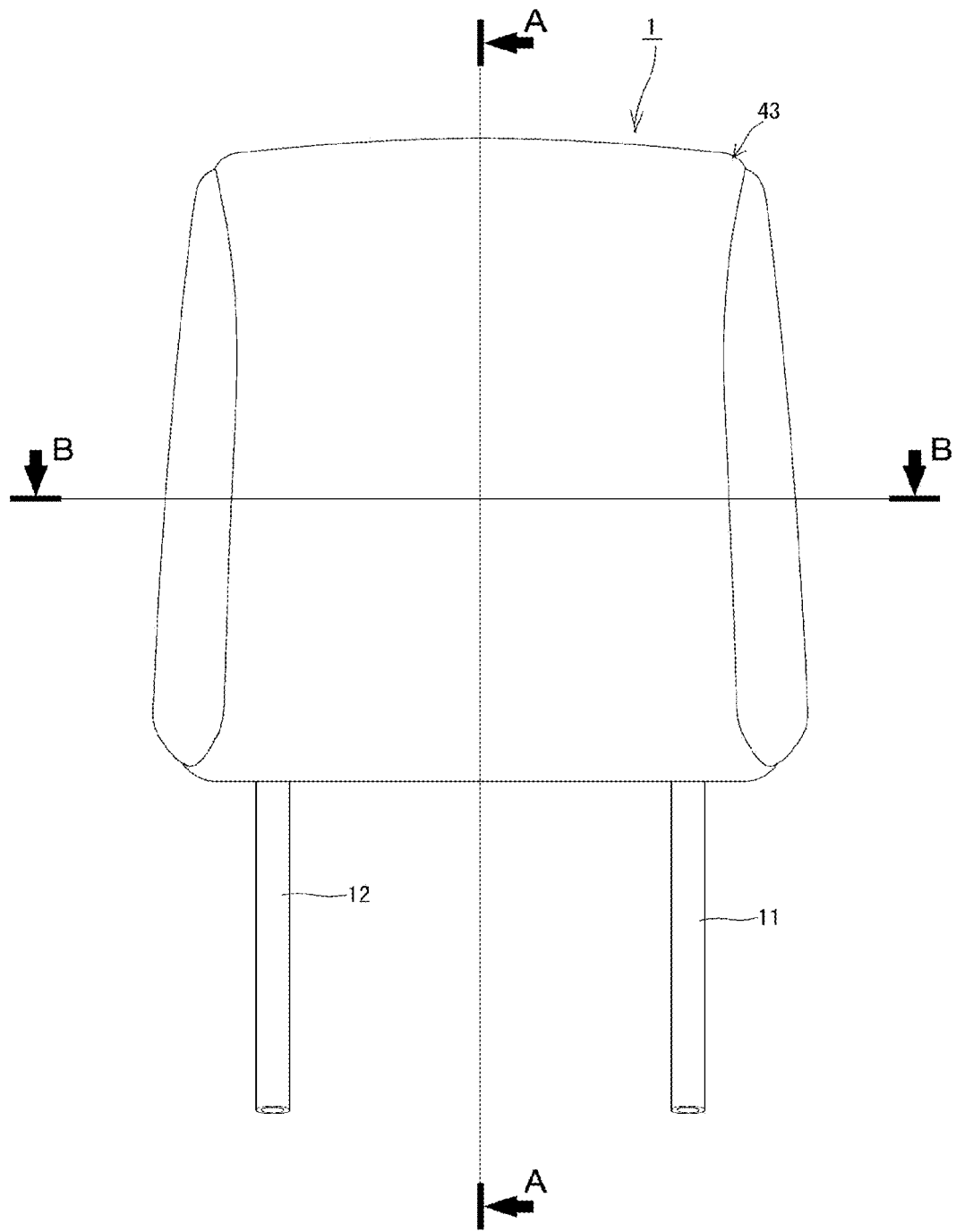
FIG. 2 is a front view of FIG. 1.
Figure 3:
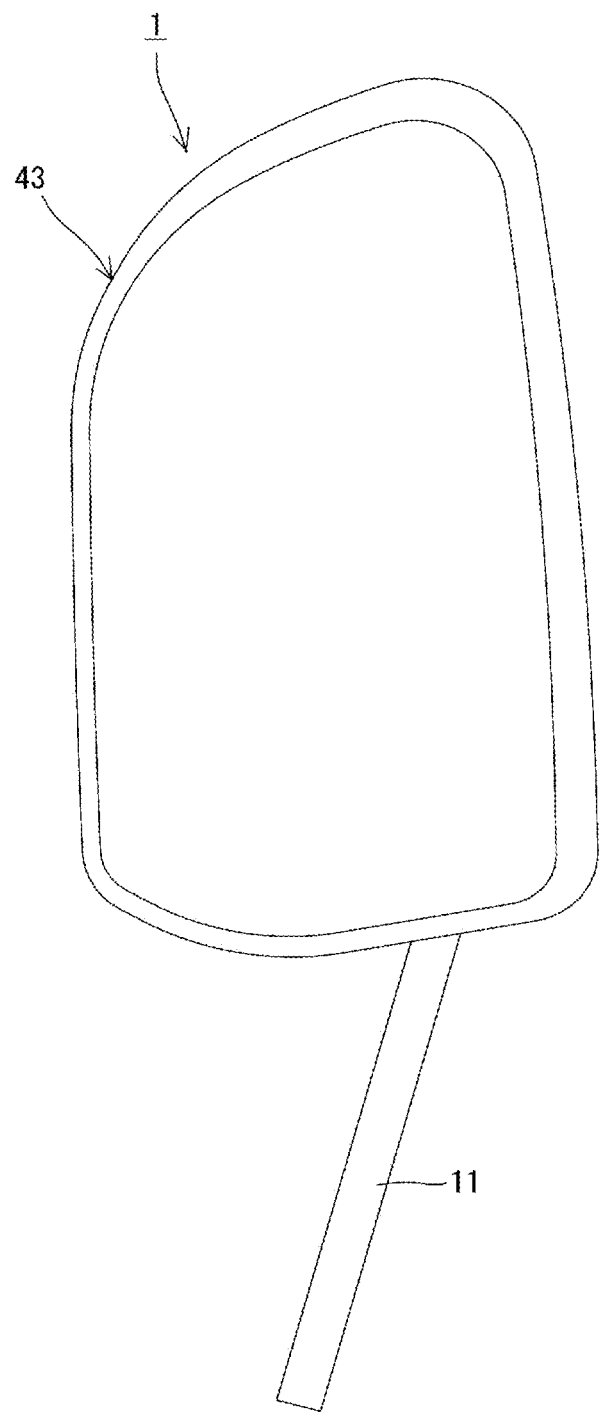
FIG. 3 is a side view of FIG. 1.

Hereinafter, the present invention will be described in more detail based on an embodiment illustrated in the drawings. FIG. 1 to FIG. 10 are views illustrating one embodiment of the present invention. In this embodiment, an acoustic device is incorporated in a headrest 1 supported on an upper portion of a seat back part of a vehicle seat.

The headrest 1 includes a headrest frame 10, speaker units 31, 32, a cushioning layer 40, a surface member 50, and so on. Out of these, the speaker units 31, 32 and the cushioning layer 40 which converts output sounds of the speaker units 31, 32 to a surface sound source are main constituent elements of the acoustic device. However, in this embodiment, the sounds are output from the headrest 1 itself to be provided to a person seated in the vehicle seat including the headrest 1, and if the headrest frame 10 is regarded as a frame of the acoustic device, the headrest 1 itself serves as the acoustic device.

Figure 9:
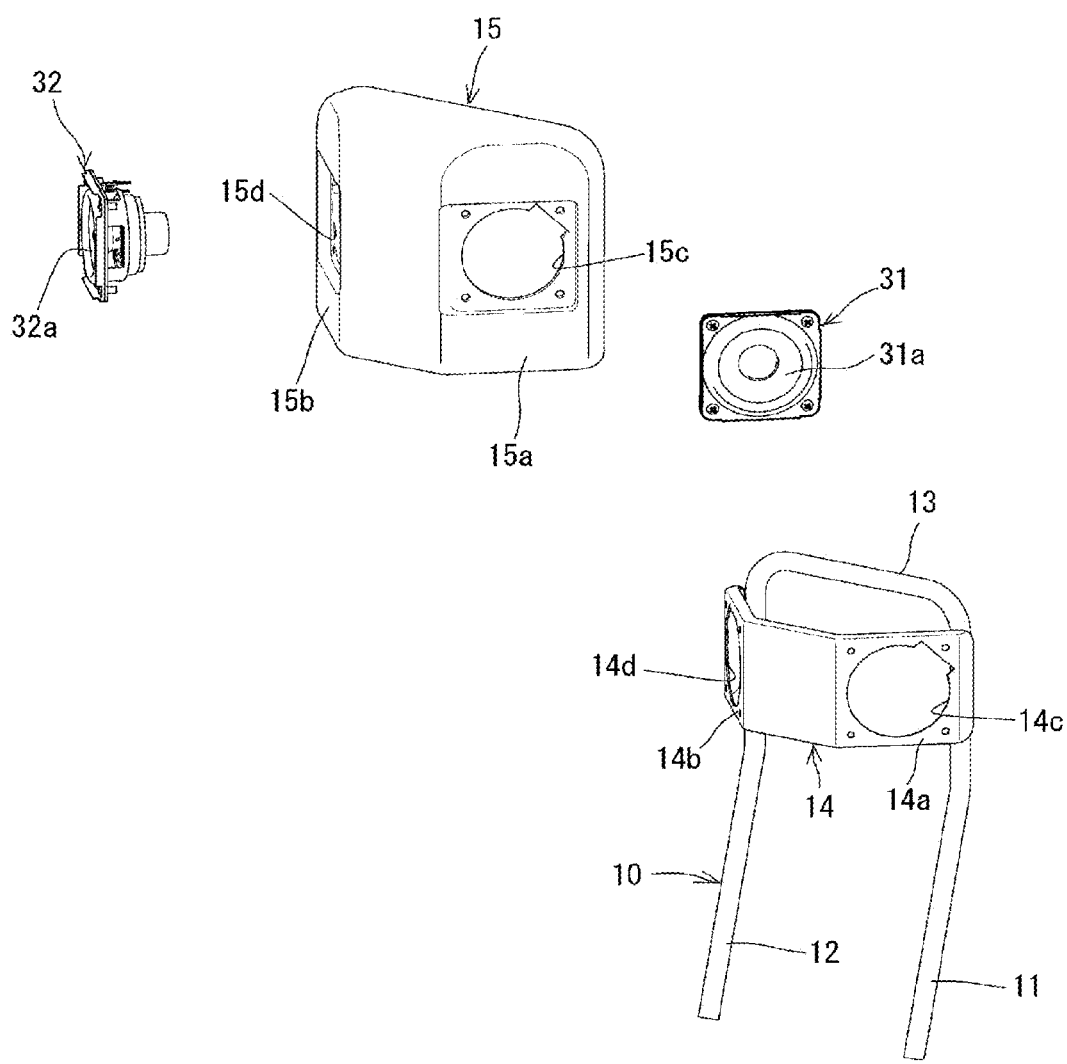
FIG. 9 is a perspective view illustrating a part including a headrest frame and the speaker units illustrated in FIG. 8 in a further exploded manner.
Figure 10:
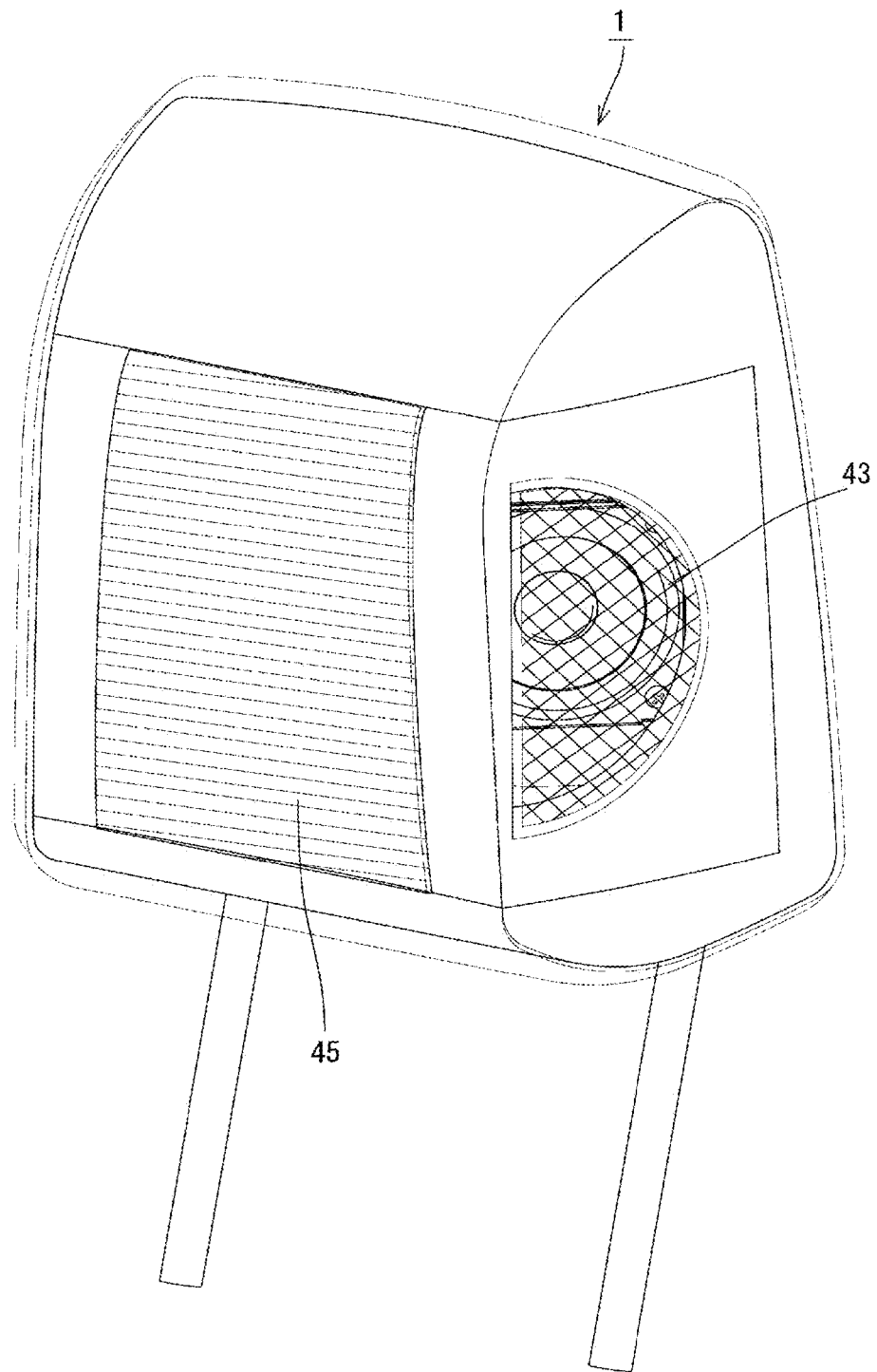
FIG. 10 is a view illustrating an example of a structure in which a sound non-propagating part is provided in the cushioning layer.

In this embodiment, the headrest frame 10 is formed in a substantially C-shape, and includes a pair of left and right headrest stays 11, 12 extending in a substantially vertical direction and an upper frame 13 connecting upper portions of the headrest stays 11, 12 (refer to FIG. 9). The headrest stays 11, 12 are inserted to a pair of guide parts (not illustrated) supported at the left and right of a back frame of the seat back part so as to be a predetermined distance apart from each other, and are adjustable in position so as to have an appropriate height. Further, near the upper portions of the headrest stays 11, 12, an attachment bracket 14 used for attaching the speaker units 31, 32 is fixed. The attachment bracket 14 includes tilting plate portions 14a, 14b tilting forward in a center direction from the headrest stays 11, 12, and attachment holes 14c, 14d are formed in the tilting plate portions 14a, 14b.

Figure 8:
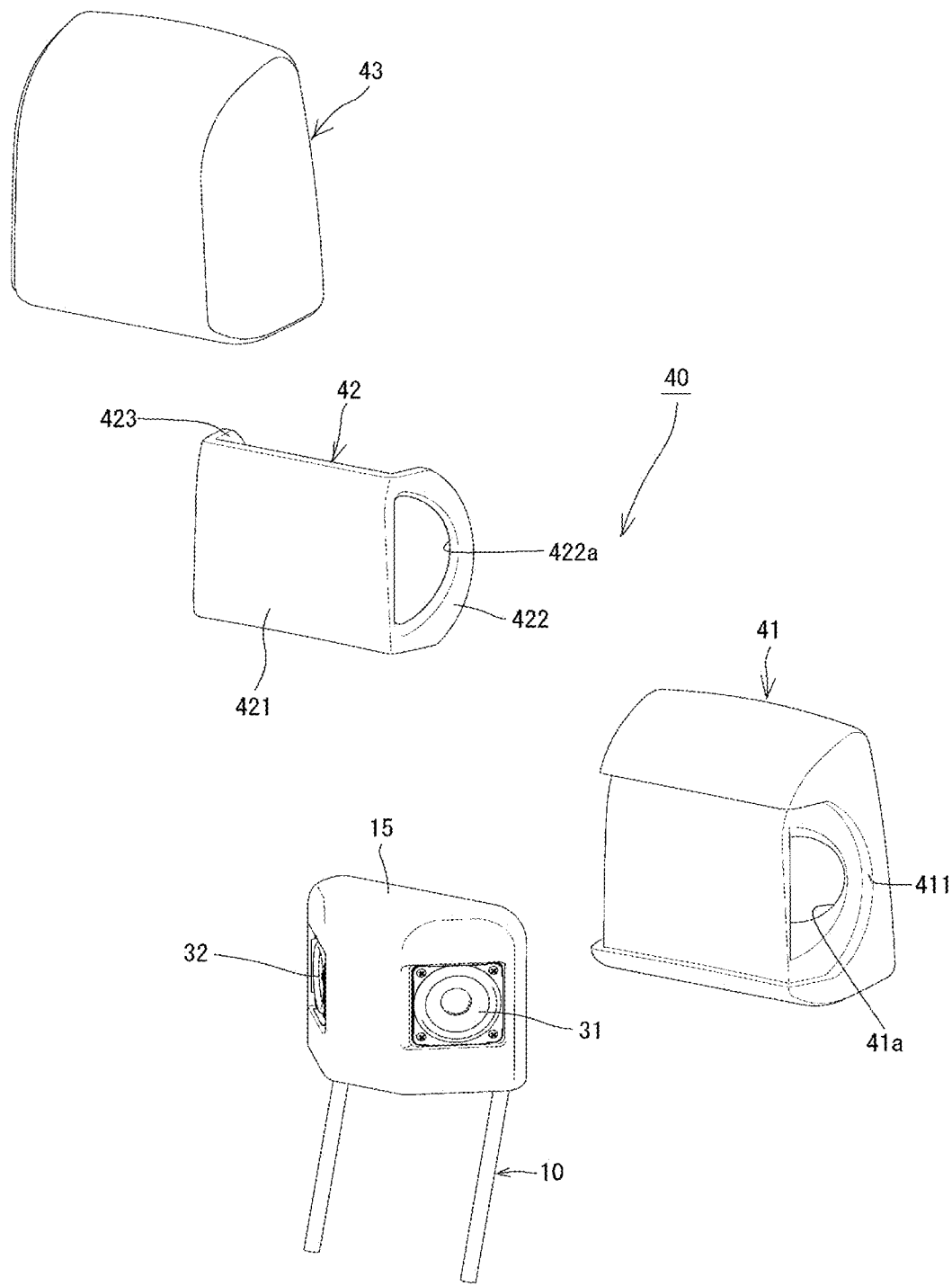
FIG. 8 is an exploded perspective view of the headrest illustrated in FIG. 1.

As illustrated in FIG. 8 and FIG. 9, the headrest frame 10 further has a reinforcing frame 15 made of a synthetic resin molded in a shape capable of covering the attachment bracket 14 from a front surface side and covering an upper surface of the upper frame 13. The reinforcing frame 15 is molded so as to conform to a shape of the attachment bracket 14, and has, at both side portions, tilting plate portions 15a, 15b tilting forward in the center direction, and attachment holes 15c, 15d are formed in the tilting plate portions 15a, 15b.

Peripheral edge portions of the speaker units 31, 32 are fixed by screwing to the aforesaid tilting plate portions 14a, 14b and 15a, 15b formed in the attachment bracket 14 and the reinforcing frame 15 respectively, and vibration plates 31a, 32a are disposed on the speaker units 31, 32 so as to face the outside from the attachment holes 14c, 14d and 15c, 15d.

Figure 4:
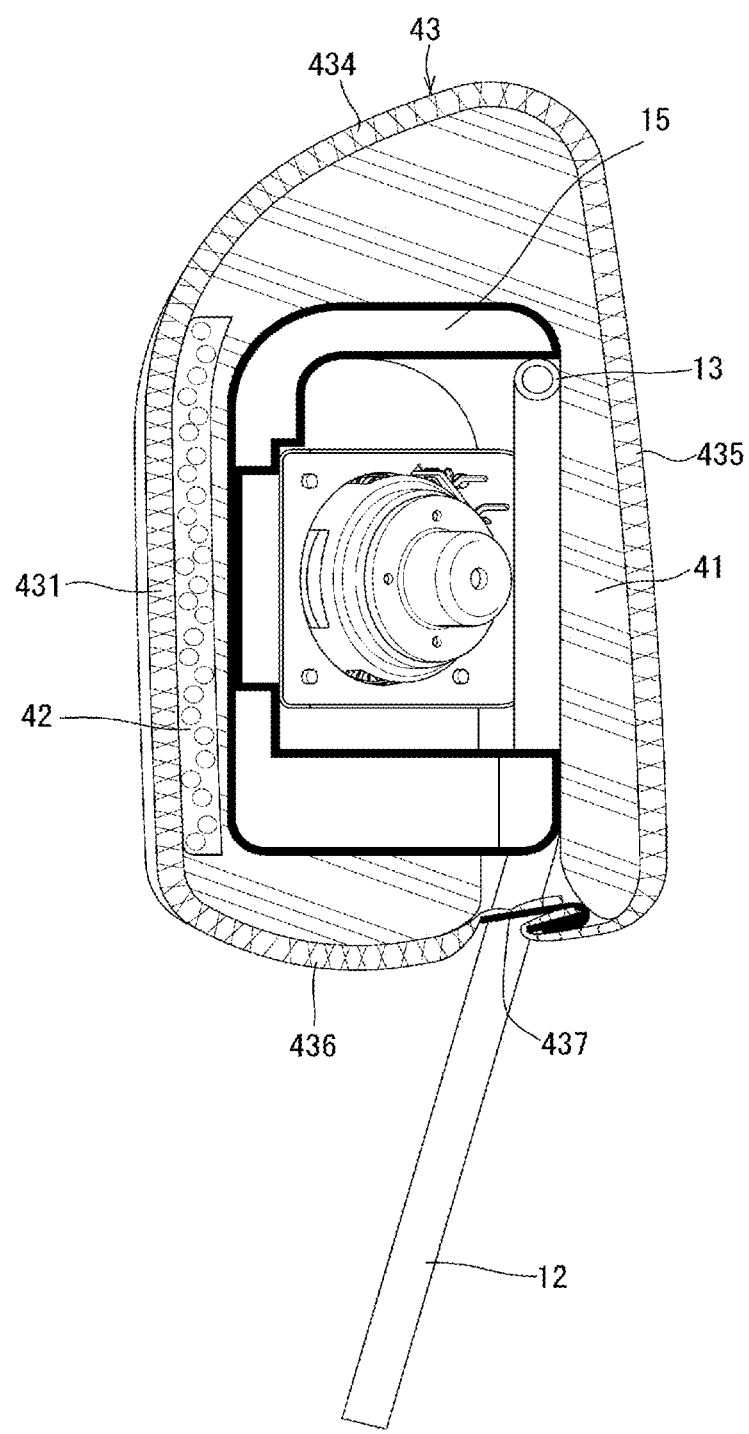
FIG. 4 is a cross-sectional view taken along A-A line in FIG. 2.
Figure 5:
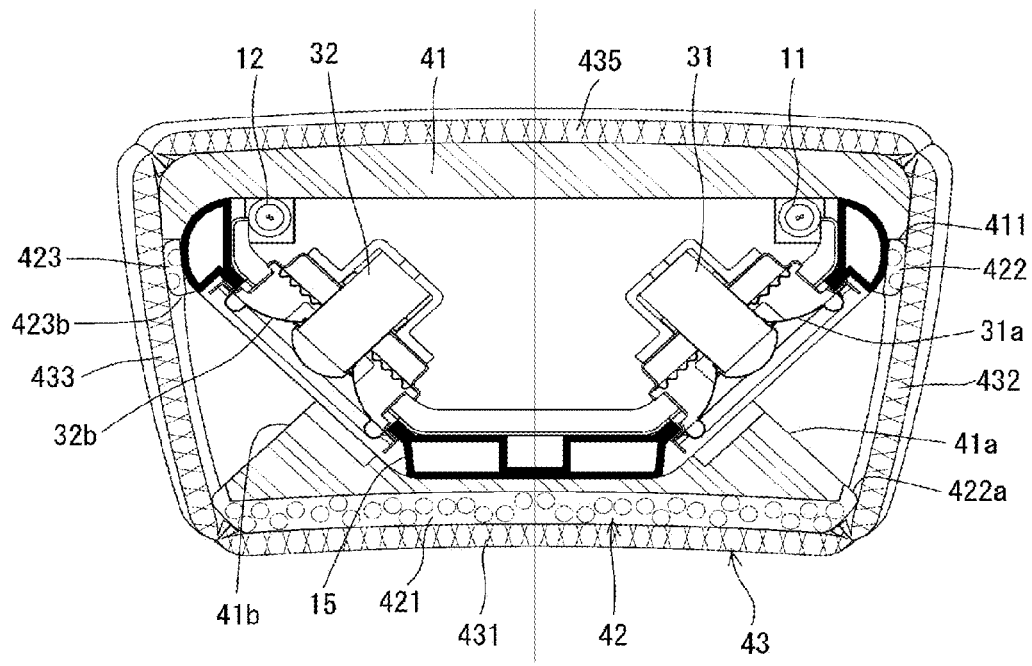
FIG. 5 is a cross-sectional view taken along B-B line in FIG. 2.
Figure 6:
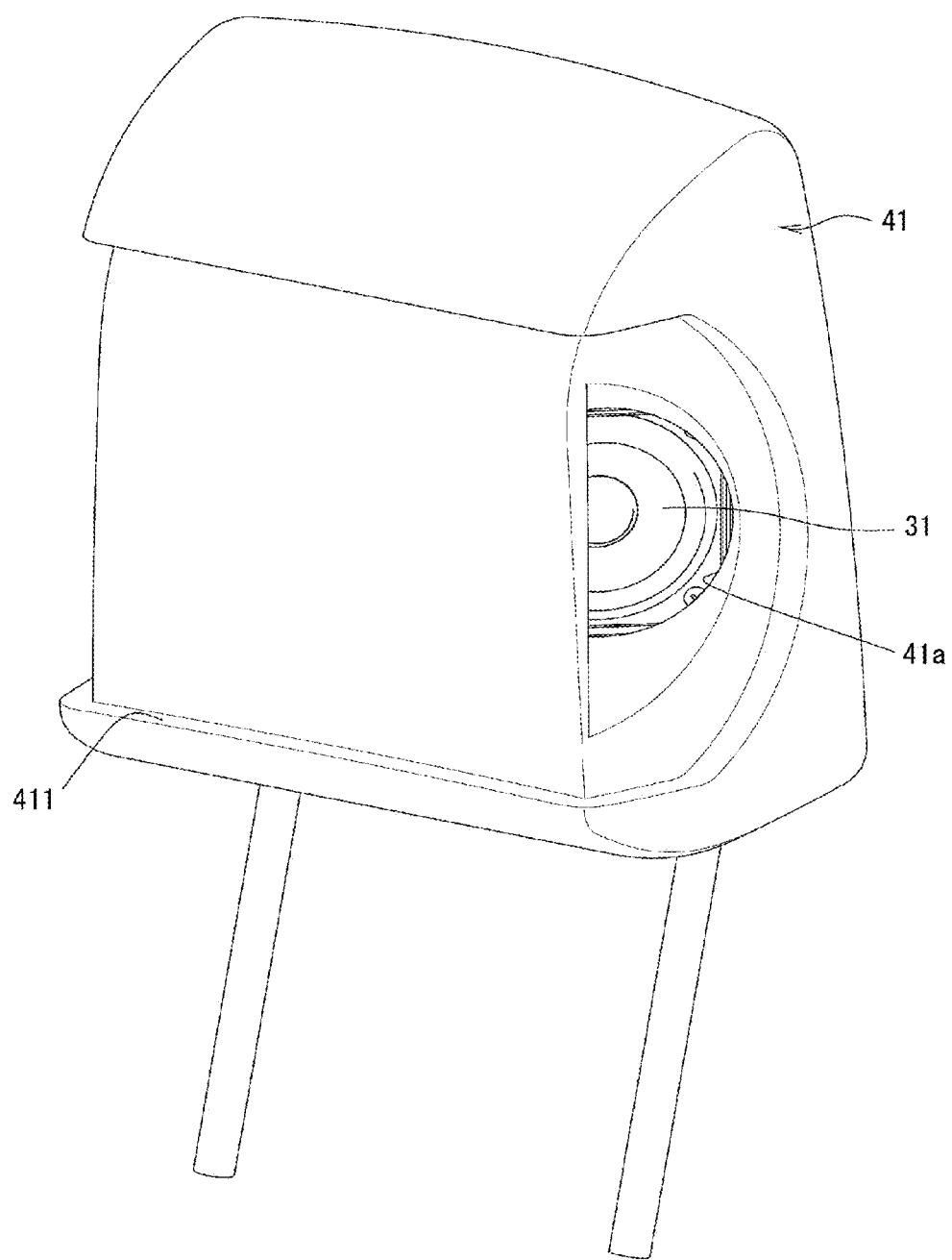
FIG. 6 is a view illustrating an arrangement relation of a pad constituting a cushioning layer and speaker units.

In this embodiment, the cushioning layer 40 includes a pad 41, a bead foam 42, and a three-dimensional knitted fabric 43. The pad 41 is formed of a urethane foam which surrounds the aforesaid reinforcing frame 15 and in which hole portions 41a, 41b are formed in both side portions being positions substantially facing the vibration plates 31a, 32a of the speaker units 31, 32. The pad 41 has a shape hung from a front surface side of the reinforcing frame 15 to a rear side of the pair of headrest stays 11, 12 as illustrated in FIG. 5 and FIG. 6, and further has a shape also covering an upper surface side of the reinforcing frame 15 as illustrated in FIG. 4. The pad 41 has a predetermined thickness, has a predetermined cushioning property, and has a function of alleviating a feeling of contact with the headrest frame 10.

Figure 7:
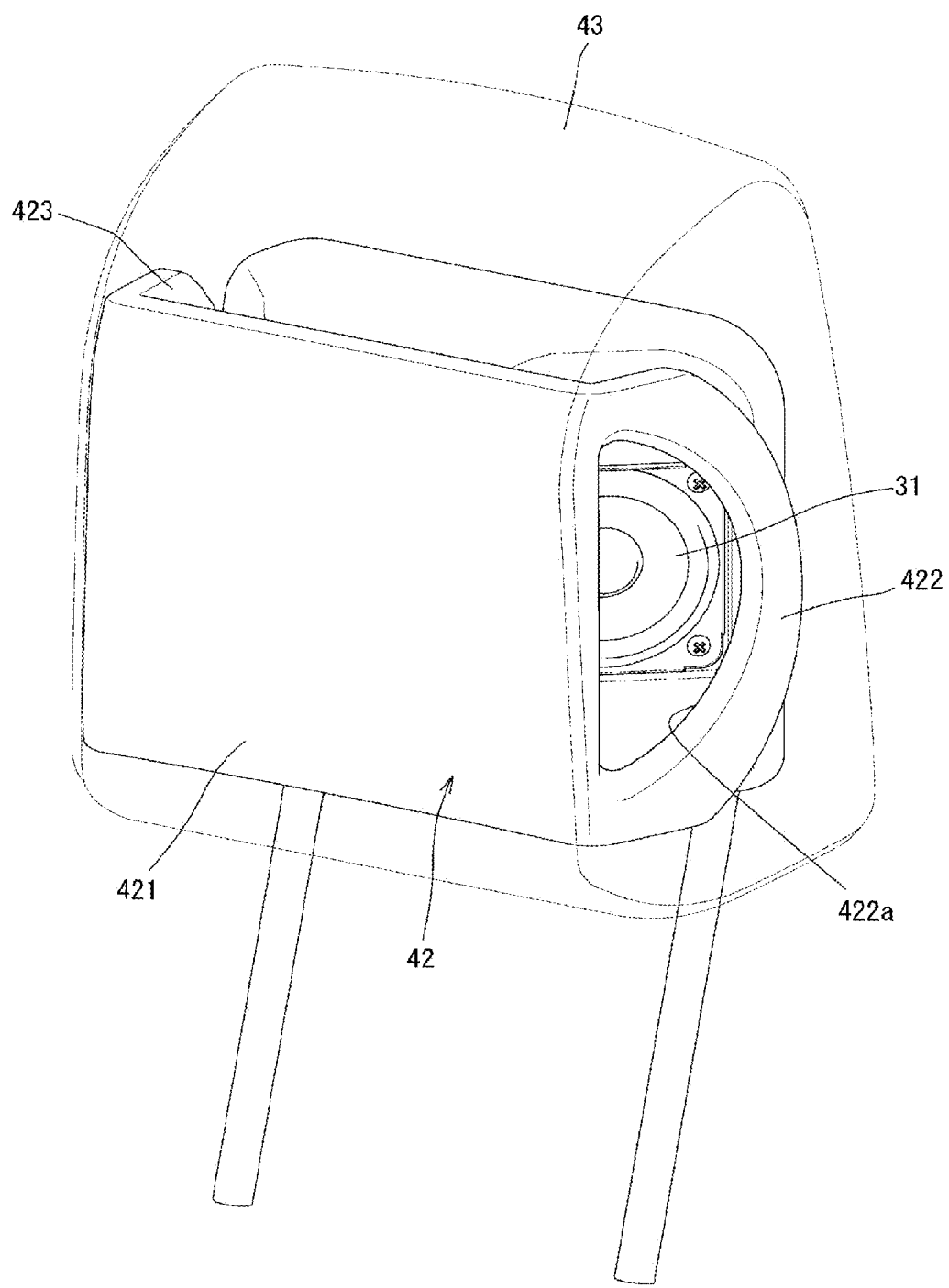
FIG. 7 is a view illustrating an arrangement relation of a bead foam constituting the cushioning layer and the speaker units.

As illustrated in FIG. 7 and FIG. 8, the bead foam 42 is formed in a substantially C-shape in a plane view, and in its both side surface portions 422, 423 which sandwich a front surface portion 421, hole portions 422a, 423b are formed respectively. Incidentally, in the aforesaid pad 41, a stepped portion 411 is formed so as to be along the shape of the bead foam 42 as illustrated in FIG. 5 and FIG. 6, and the bead foam 42 is disposed with its front surface portion 421 and side surface portions 422, 423 being fit in the stepped portion 411. Further, the hole portions 422a, 423b of the bead foam 42 are formed so as to communicate with the hole portions 41a, 41b of the pad 41 respectively.

As the bead foam 42, a foam molded body formed by a bead method of a resin including at least one of polystyrene, polypropylene, and polyethylene is usable, for instance. The bead foam 42 propagates sound vibration caused by the output sounds of the speaker units 31, 32 as membrane vibration due to a property of spherical resin films constituting individual fine beads and formed by foaming. An expansion ratio is not limited but is preferably about 25 to 50. Owing to soft elasticity that the beads have, the bead foam 42 has a cushioning property high enough to elastically support the head.

The three-dimensional knitted fabric 43 has a front surface portion 431, side surface portions 432, 433, an upper surface portion 434, a rear surface portion 435, and a bottom surface portion 436, and is formed in a shape so that the front surface portion 431 and the side surface portions 432, 433 cover the front surface portion 421 and the side surface portions 422, 423 of the bead foam 42, and the upper surface portion 434 and the rear surface portion 435 cover the pad 41. After the bead foam 42 and the pad 41 are covered, an end portion of the bottom surface portion 436 and an end portion of the rear surface portion 435 are engaged with each other via an engaging member 437. The three-dimensional knitted fabric 43 thus covers peripheries of the bead foam 42 and the pad 41, but is formed to have an inner periphery slightly shorter than a total outer periphery of the bead foam 42 and the pad 41, so that tension is generated when it is disposed to cover them.

Further, the side surface portions 432, 433 are disposed so as to substantially face the hole portions 422a, 423b of the bead foam 42, and as a result, the side surface portions 432, 433 of the three-dimensional knitted fabric 43 are provided at positions substantially facing the speaker units 31, 32 while being given the tension in the surface direction.

Here, the three-dimensional knitted fabric 43 is formed by connecting a pair of ground knitted fabrics disposed apart from each other, by a connecting yarn. The ground knitted fabrics each can be formed to have a flat knitted fabric structure (fine mesh) continuous both in a wale direction and a coarse direction, or a knitted fabric structure having honeycomb-shaped (hexagonal) meshes, by using yarns of twisted fibers, for instance. The connecting yarn imparts predetermined rigidity to the three-dimensional knitted fabric 43 so that one of the ground knitted fabrics and the other ground knitted fabric are kept apart from each other by a predetermined distance. Therefore, applying the tension in the surface direction makes it possible to cause string vibration of the yarns of the facing ground knitted fabrics constituting the three-dimensional knitted fabric 43 or the connecting yarn connecting the facing ground knitted fabrics.

Consequently, the string vibration is generated due to sound vibration by the output sounds of the speaker units 31, 32, and acoustic waves propagated in the surface direction of the three-dimensional knitted fabric 43 and radiated forward from the three-dimensional knitted fabric 43 become acoustic waves whose surface sound source is the three-dimensional knitted fabric 43. That is, if the output sounds of the speaker units 31, 32 are point sound sources, the three-dimensional knitted fabric 43 has a function of converting the output sounds to the acoustic waves from a surface sound source with a larger area and radiating the converted acoustic waves to the outside. In a case where the tension is not applied to the three-dimensional knitted fabric 43, the connecting yarn becomes loose and is not vibrated by the output sounds of the speaker units 31, 32, and the sounds only pass forward through the meshes. The tension applied to the three-dimensional knitted fabric 43 is arbitrarily adjustable by density of the connecting yarn constituting the three-dimensional knitted fabric 43, and so on, but in any case, it is preferable that the three-dimensional knitted fabric 43 is disposed while being given the tension so that it is elongated by a 20% extent or less, preferably by a 1 to 15% extent, and more preferably a 3 to 10% extent from a state where it is given no tension in the surface direction.

The three-dimensional knitted fabric 43 also has a function of elastically supporting the head. That is, it supports a load by deformation and a restoring force of the meshes constituting the ground knitted fabrics, deformation (tilting and buckling) of the connecting yarn, and a restoring force of the adjacent connecting yarn giving a spring property to the deformed connecting yarn. Therefore, the connecting yarn needs to be capable of suitably exhibiting such a function, and that having a thickness in a 167 to 1110 decitex range is preferably used. If the thickness is less than 167 decitexes, it is difficult to obtain stiffness, and when the thickness is over 1110 decitexes, the connecting yarn becomes too hard, which makes it difficult to obtain appropriate elasticity.

As a material of the yarns forming the ground knitted fabrics or the connecting yarn, those of various kinds are usable, and examples thereof are synthetic fibers and regenerated fibers such as polypropylene, polyester, polyamide, polyacrylonitrile, and rayon, and natural fibers such as wool, silk, and cotton. The above materials each may be used independently, or an arbitrary combination of these is also usable. The material is preferably a thermoplastic polyester-based fiber represented by polyethylene terephthalate (PET), polybutylene terephthalate (PBT), or the like, a polyamide-based fiber represented by nylon 6, nylon 66, or the like, a polyolefin-based fiber represented by polyethylene, polypropylene, or the like, or a combination of two kinds of these fibers or more. Further, a yarn shape of the ground yarns or the connecting yarn is not limited either, and they each may be any of a round cross-section yarn, a modified cross-section yarn, a hollow yarn, and so on. Further, a carbon yarn, a metallic yarn, or the like is also usable.

Incidentally, the conversion function to the surface sound source by the three-dimensional knitted fabric 43, which uses the aforesaid string vibration, enables the production of sounds with various properties (sound pressure, sound quality, and so on) depending on the thickness of the three-dimensional knitted fabric 43, the knitted fabric structure of the ground knitted fabrics, a way the connecting yarn is knitted to the ground knitted fabrics, the thickness and materials of the yarns forming the ground knitted fabrics and the connecting yarn, and so on. Therefore, depending on the selection of the three-dimensional knitted fabric 43 used, one that puts emphasis on a low register, one that puts emphasis on a middle register, one that puts emphasis on an upper register, one that puts emphasis on a filtering function of noise or a specific register, or the like can be manufactured.

Further, when at least one of: fabrics including a knitted fabric, a woven fabric, and a non-woven fabric that are two dimensional or three dimensional; synthetic leather; genuine leather; a synthetic resin film; and a bead foam is combined with the three-dimensional knitted fabric 43, for example, when any of these is used in a state of being stacked on the three-dimensional knitted fabric 43 or in a state of being coupled to the three-dimensional knitted fabric 43 in the surface direction, it is possible to provide various kinds of headrests 1 with different acoustic features.

According to this embodiment, the output sounds of the speaker units 31, 32 enter the side surface portions 432, 433 of the three-dimensional knitted fabric 43 through the hole portions 41a, 41b of the pad 41 and the hole portions 422a, 423b of the bead foam 42. Since the three-dimensional knitted fabric 43 is disposed while being given the predetermined tension as described above, the string vibration of the connecting yarn and the yarns constituting the ground knitted fabrics is caused by the sound vibration of the output sounds, and their vibration is propagated in the surface direction. As a result, from the three-dimensional knitted fabric 43, the sounds are radiated as acoustic waves whose surface sound source is the three-dimensional knitted fabric 43. Therefore, even an object having a limited size, such as the headrest 1, can be structured as an acoustic device having an acoustic feature of the surface sound source with a simple structure.

Further, in the cushioning layer 40 of this embodiment, the bead foam 42 is stacked on the three-dimensional knitted fabric 43. Since the membrane vibration is generated in the bead foam 42 as described above, the output sounds entering the side surface portions 432, 433 of the three-dimensional knitted fabric 43 are propagated toward the front surface portion 431 of the three-dimensional knitted fabric 43, and in addition, aerial vibration is generated in the bead foam 42 due to resonance of cells of the beads, and this bead foam 42 also has a function of generating a surface sound source. Therefore, it is possible to obtain an acoustic feature different from that obtained when only the three-dimensional knitted fabric 43 is used.

Further, the hole portions 422a, 423b are formed in the bead foam 42, the three-dimensional knitted fabric 43 is disposed in the tense state to cover the hole portions 422a, 423b, and when the membrane vibration of the bead foam 42 and the string vibration of the three-dimensional knitted fabric 43 are generated by the output sounds of the speaker units 31, 32, the aerial vibration is generated in the hole portions 422a, 423b and resonates with the output sounds. As a result, it is possible to propagate the acoustic waves of the surface sound source with a higher sound pressure level, owing to the resonance, even with the compact structure. Therefore, in this embodiment, a resonance part is formed by the bead foam 42, the hole portions 422a, 423b, and the three-dimensional knitted fabric 43.

Incidentally, when the sounds are propagated as the surface sound source from the cushioning layer 40, it is sometimes desired, for example, to make adjustment so that the sounds are propagated to the vicinity of the temporal regions of the head of a person seated in the vehicle seat and the sounds are prevented from being propagated directly to the back of the head. In this case, it is necessary to provide a sound non-propagating part at a position corresponding to the back of the head, but in the case where the three-dimensional knitted fabric 43 is used as the cushioning layer 40 as in this embodiment, only by a process of bringing the ground knitted fabrics of the three-dimensional knitted fabric 43 into proximity to each other at the position corresponding to the back of the head, for example, only by performing a process of welding the both by vibration welding or the like or sewing the both together, the string vibration of the connecting yarn and so on is not generated, which makes it possible to easily set a sound non-propagating part 45 (refer to FIG. 10).

(Test Regarding Sound Diffusion Characteristic of Three-Dimensional Knitted Fabric)

A test was conducted regarding a sound diffusion characteristic when a three-dimensional knitted fabric was disposed in front of a speaker.

Figure 11:
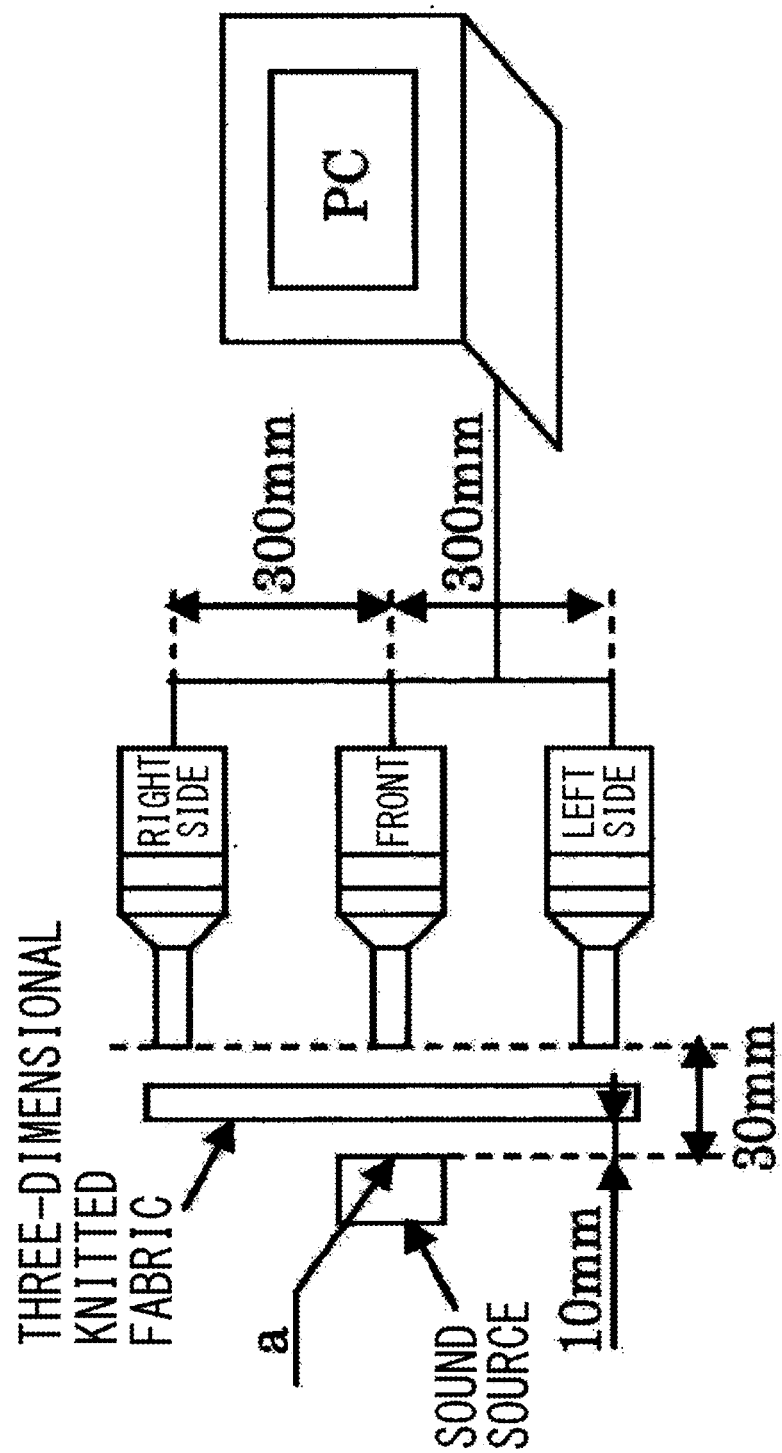
FIG. 11 is an explanatory view of a test method regarding a sound diffusion characteristic.

As illustrated in FIG. 11, in the test, the three-dimensional knitted fabric was disposed at a position 10 mm in front of the speaker (sound source) having a 70 mm outside diameter, having a cone with a 40 mm diameter, and having a vibration plate with a 25 mm diameter, noise meters (NL-14 manufactured by RION Co., Ltd.) were disposed respectively at positions that were apart from the sound source by 30 mm and that were on a sound source front and on a sound source right side and a sound source left side which were apart from a center position of the sound source front by 300 mm, and transmissibilities of measured sounds on the sound source front, right side, and left side to a reference sound measured at a position "a" in FIG. 11 near the sound source were calculated. A sampling frequency was set to 8000 Hz.

As the three-dimensional knitted fabric, the following three kinds were each used independently.

[Sample 1] product number: 49013D (manufactured by Sumie Textile Co., Ltd.), 10 mm thickness
material:
front-side ground knitted fabric . . . twisted yarn of two polyethylene terephthalate fiber false twisted yarns with 450 decitexes/108 f
rear-side ground knitted fabric . . . twisted yarn of two polyethylene terephthalate fiber false twisted yarns with 450 decitexes/108 f
connecting yarn . . . polytrimethylene terephthalate monofilament with 350 decitexes/1 f

[Sample 2] product number: AKE70042 (manufactured by Asahi Kasei Corporation), 7 mm thickness

[Sample 3] product number: T28019C8G (manufactured by Asahi Kasei Corporation), 7 mm thickness Further, regarding a case where the three-dimensional knitted fabric was not disposed ("no net") as a comparative example, transmissibilities of measured sounds to the reference sound were found by disposing sensors at the same positions as above.

Results are shown in FIG. 12 to FIG. 15.

Figure 12:
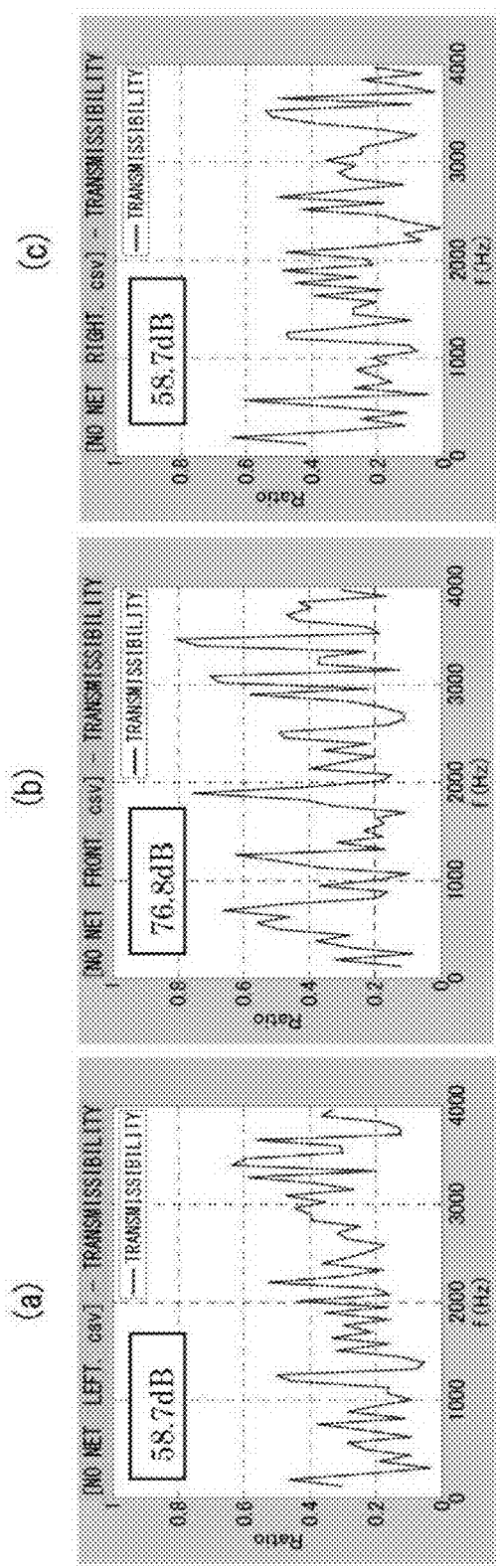
FIG. 12 are charts illustrating test results of a comparative example in the test regarding the sound diffusion characteristic, (a) being a chart illustrating a transmissibility of a measured sound on "a sound source left side", (b) being a chart illustrating a transmissibility of a measured sound on "a sound source front", and (c) being a chart illustrating a transmissibility of a measured sound on "a sound source right side".
Figure 13:
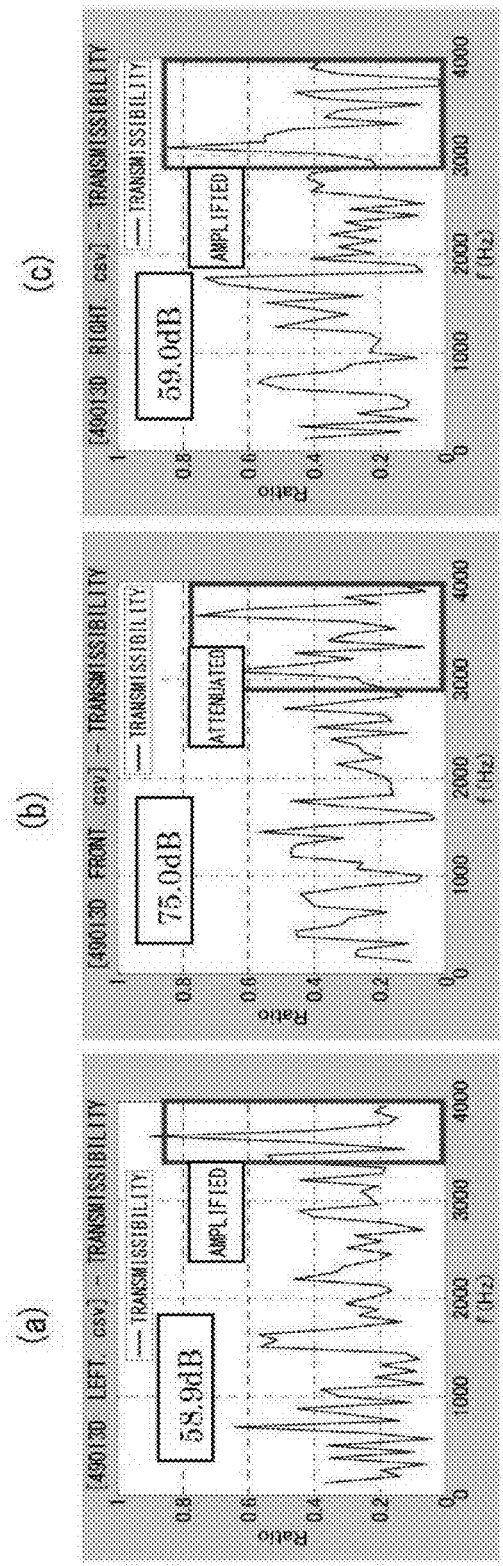
FIG. 13 are charts illustrating test results of a sample 1 in the test regarding the sound diffusion characteristic, (a) being a chart illustrating a transmissibility of a measured sound on "the sound source left side", (b) being a chart illustrating a transmissibility of a measured sound on "the sound source front", and (c) being a chart illustrating a transmissibility of a measured sound on "the sound source right side".
Figure 14:
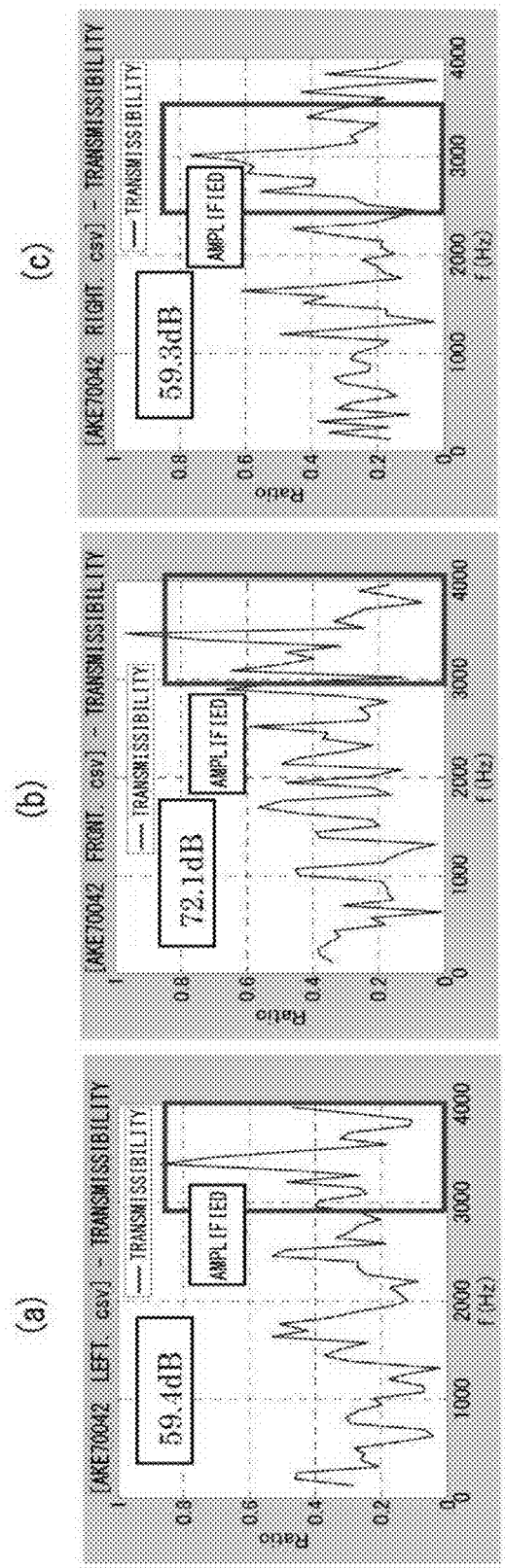
FIG. 14 are charts illustrating test results of a sample 2 in the test regarding the sound diffusion characteristic, (a) being a chart illustrating a transmissibility of a measured sound on "the sound source left side", (b) being a chart illustrating a transmissibility of a measured sound on "the sound source front", and (c) being a chart illustrating a transmissibility of a measured sound on "the sound source right side".
Figure 15:
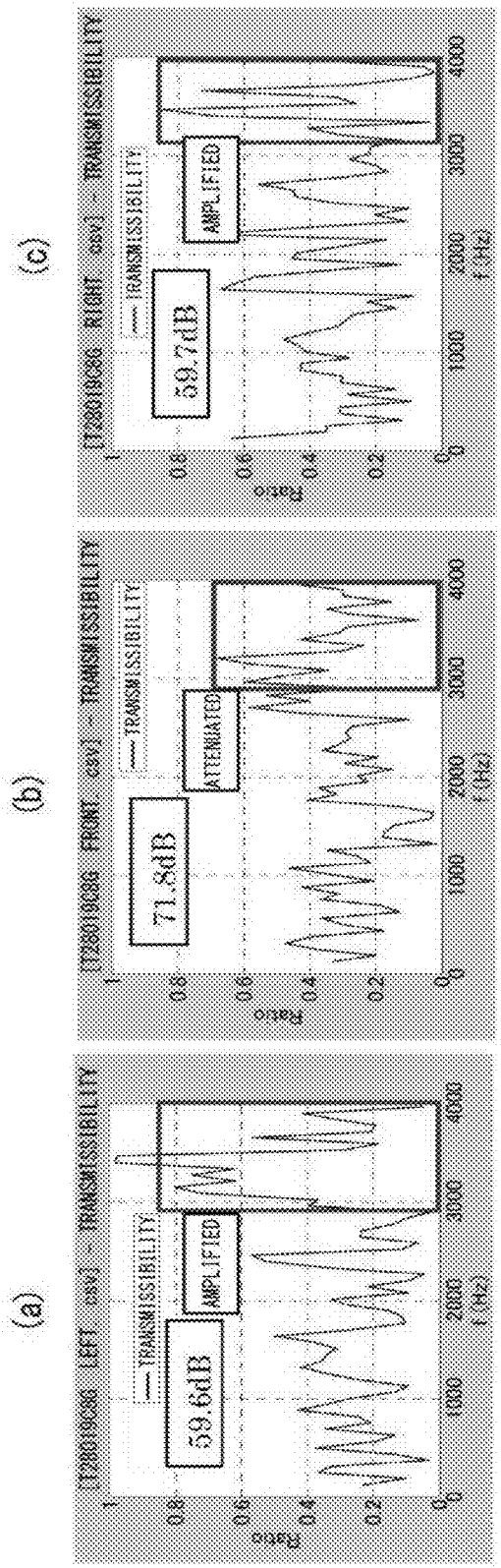
FIG. 15 are charts illustrating test results of a sample 3 in the test regarding the sound diffusion characteristic, (a) being a chart illustrating a transmissibility of a measured sound on "the sound source left side", (b) being a chart illustrating a transmissibility of a measured sound on "the sound source front", and (c) being a chart illustrating a transmissibility of a measured sound on "the sound source right side".

FIG. 12 illustrate measurement results of "no net" as the comparative example, FIG. 13 illustrate measurement results when the three-dimensional knitted fabric whose product number is "49013D" being the sample 1 is disposed, FIG. 14 illustrate measurement results when the three-dimensional knitted fabric whose product number is "AKE70042" being the sample 2 is disposed, and FIG. 15 illustrate measurement results when the three-dimensional knitted fabric whose product number is "T28019C8G" being the sample 3 is disposed. Further, in FIG. 12 to FIG. 15, (a) is the transmissibility of the measured sound on "the sound source left side", (b) is the transmissibility of the measured sound on "the sound source front", and (c) is the transmissibility of the measured sound on "the sound source right side".

First, in the case of the comparative example in FIG. 12, the transmissibilities on the sound source left side and right side are lower as compared with the transmissibility on the sound source front.

On the other hand, in the sample 1 in FIG. 13, as compared with the comparative example, on the sound source front, the sound is attenuated by the three-dimensional knitted fabric and the transmissibility decreases, but on the sound source left side, the transmissibility of the vicinity of 3500 to 3600 Hz increases and on the sound source right side, the transmissibility of the vicinity of 2900 to 4000 Hz increases.

In the sample 2 in FIG. 14, as compared with the comparative example, the transmissibilities decrease or almost the same in a band of 3000 Hz or less on the sound source front and the sound source left side and in a band of 2500 Hz or less on the sound source right side. However, on the sound source front and on the sound source left side, the transmissibilities of the vicinity of 3000 to 4000 Hz, especially the vicinity of 3000 to 3500 Hz increase. In the case of the sound source right side, the transmissibility of the vicinity of 2500 to 3500 Hz increases.

In the sample 3 in FIG. 15, as compared with the comparative example, the transmissibility is attenuated in all the bands on the sound source front, but on the sound source left side and the sound source right side, the transmissibilities of the vicinity of 3000 to 4000 Hz increase.

Figure 16:
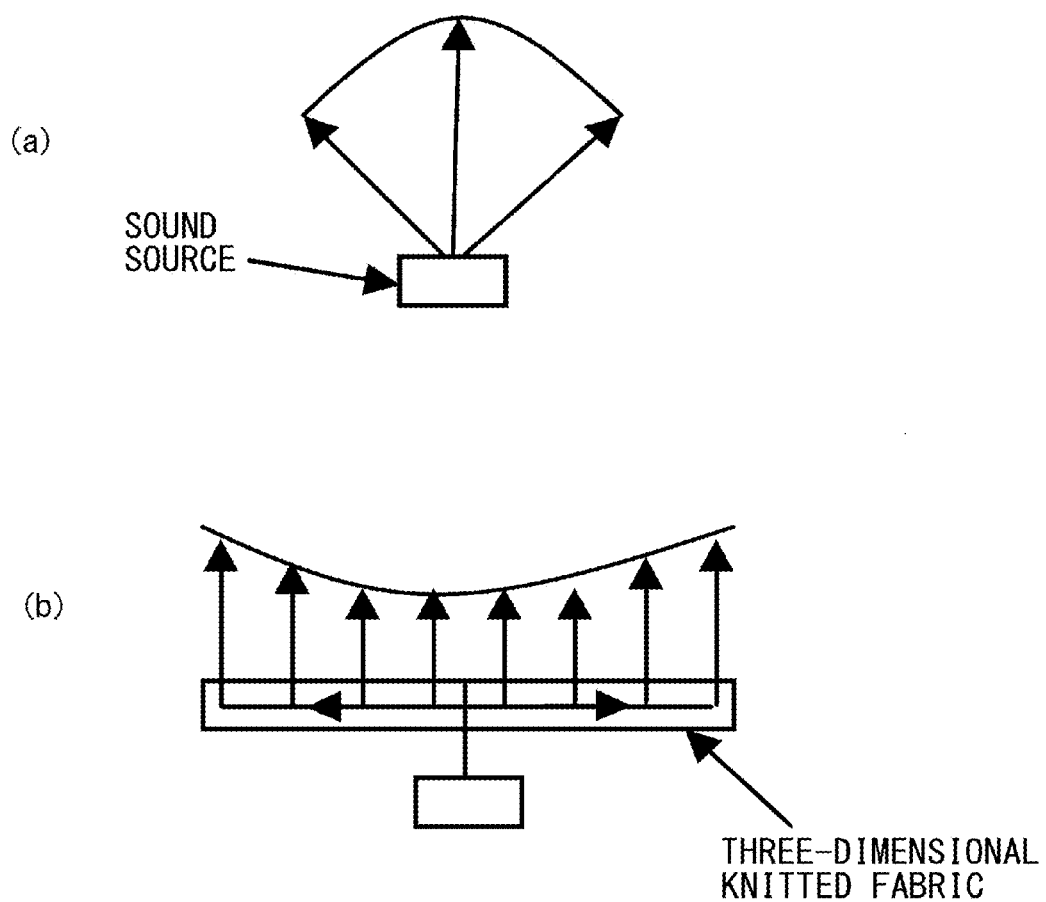
FIG. 16(*a*) is an image view illustrating a sound diffusion state when a three-dimensional knitted fabric is not interposed, and FIG. 16(*b*) is an image view illustrating a sound diffusion state when the three-dimensional knitted fabric is interposed.

From the above test results, it is seen that the sound has directivity as in FIG. 16(a) when the three-dimensional knitted fabric is not interposed, but when the three-dimensional knitted fabric is interposed, the sound vibrates the yarns of the ground knitted fabrics of the three-dimensional knitted fabric and the connecting yarn due to the resonance and spreads to be diffused in the surface direction, and especially on the sound source left side and the sound source right side, the sound amplifying effect is obtained as in FIG. 16(b). On the other hand, it is also seen that, since the sound diffusion states of the three-dimensional knitted fabrics of the sample 1 to the sample 3 are not uniform, it is possible to obtain various acoustic features depending on which one of them is adopted, a way they are stacked, and so on.

(Test of Acoustic Effect Depending on Difference in Material)

Figure 17:
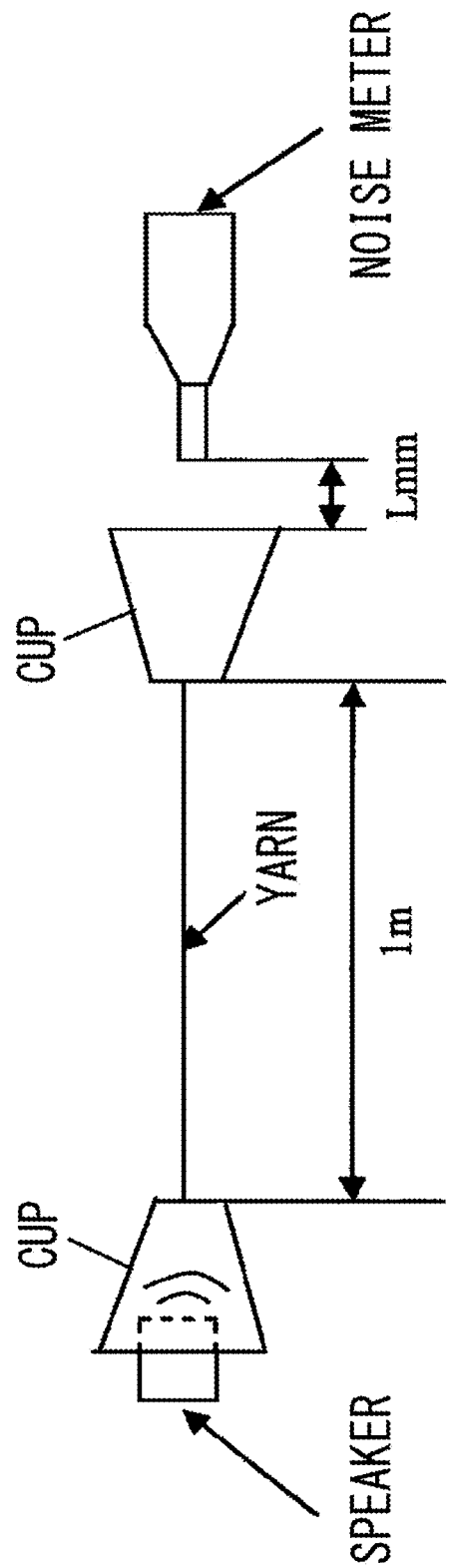
FIG. 17 is an explanatory view of a test method of an acoustic effect depending on difference in material.

Difference in acoustic feature depending on difference in material of the yarns of the ground knitted fabrics constituting the three-dimensional knitted fabric and the connecting yarn was studied. In the test, as illustrated in FIG. 17, end portions of each of 1 m yarns of nylon, fluorocarbon (polyvinylidene fluoride), and polyethylene (PE) (each having a 0.234 mm yarn diameter (No. 2)) were fixed to rear surfaces of cups, and a speaker was disposed in one of the cups and was made to output white noise (0 to 22050 Hz), a sound with a single frequency of 50 Hz, and a sound with a single frequency of 100 Hz, and noise meters were disposed at measurement positions apart from an opening edge of the other cup by L mm (−40 mm, 50 mm, 100 mm) to measure changes of sound pressure level. Incidentally, out of the three yarns, the nylon has the lowest elasticity, and the polyethylene has the highest elasticity.

Figure 18:
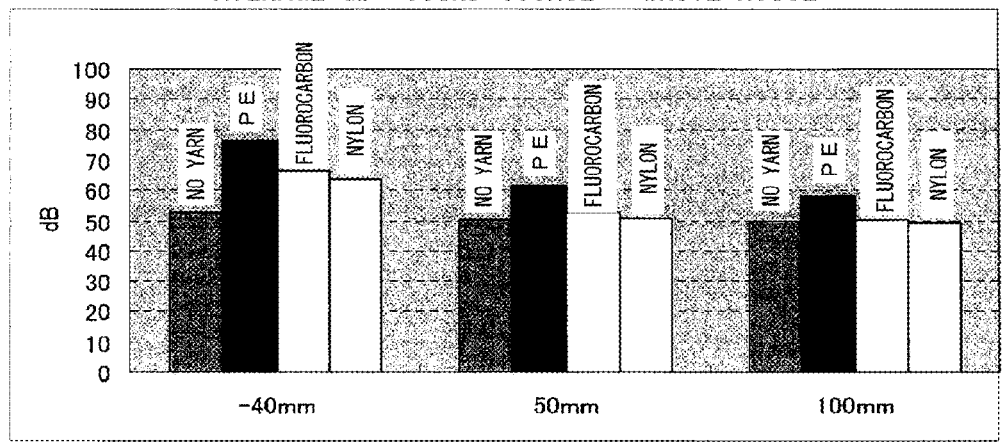
FIG. 18 are charts illustrating measurement results of the test in FIG. 17, (a) being a chart illustrating a measurement result when a sound source is white noise (0 to 22050 Hz), (b) being a chart illustrating a measurement result when a sound source is a sound with a single frequency of 50 Hz, and (c) being a chart illustrating a measurement result when a sound source is a sound with a single frequency of 100 Hz.
Figure 18:
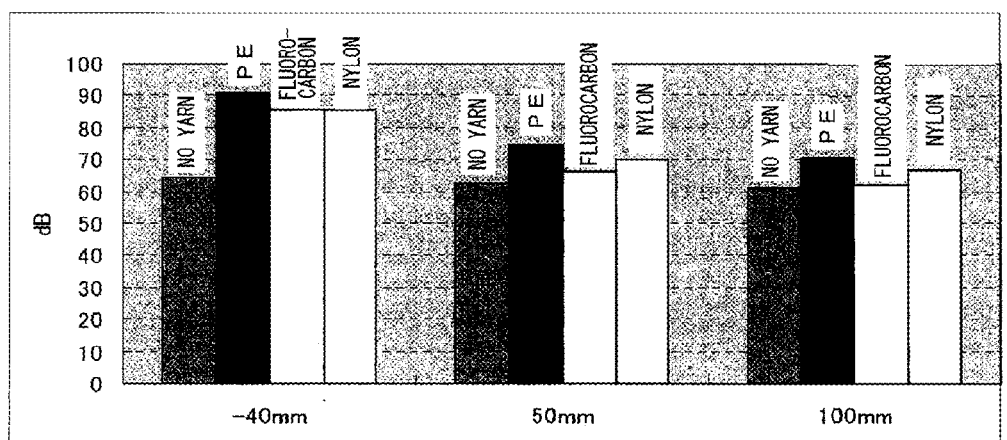
Figure 18:
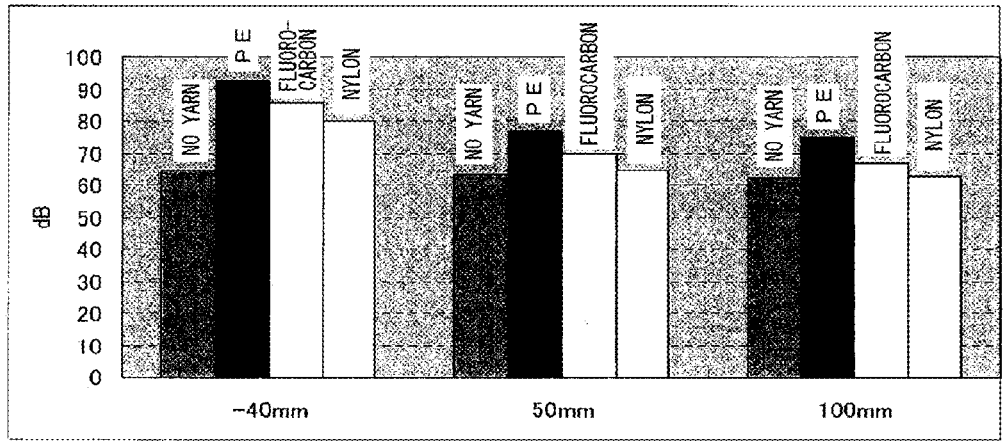

In the test, a sound pressure of each of the sounds which were output from the speaker was set to 80 dB, these sounds were output from the speaker for 25 seconds, and the measurement was conducted. Incidentally, for comparison, sound pressures at the respective measurement positions in a case where a yarn was not stretched between the two cups were also measured (indicated as "no yarn" in the drawings). FIG. 18 each illustrate average sound pressures during 25 seconds at the respective measurement positions.

As is apparent from FIG. 18, the sound pressure levels of all the white noise (0 to 22050 Hz), the sound with the single frequency of 50 Hz, and the sound with the single frequency of 100 Hz were highest when the polyethylene was used. The sound pressure levels were about equal when the fluorocarbon was used and when the nylon was used, but there was a tendency that the sound pressure level was higher when the fluorocarbon was used. In the case of "no yarn", the attenuation was larger than when the yarn was stretched, but at the measurement position L=100 mm, there is no noticeable difference as compared with the case where the fluorocarbon or the nylon was used, and it is thought that, at the measurement position L=100 mm, there is an influence not by the sound transmitted through the yarn but by surrounding sound.

Further, in all the cases where the polyethylene, fluorocarbon, and nylon yarns were used, the sound pressure level was highest at the measurement position L=−40 mm, and then the sound pressure level decreased in accordance with an increase of the distance from the cup, in order of L=50 mm and L=100 mm.

From the above, it is seen that the sound transmission characteristic differs depending on the kind of the yarn, and various acoustic features can be obtained, depending on which material is selected for the yarns used in the three-dimensional knitted fabric.

(Test Regarding Sound Diffusion Characteristic Depending on Difference in Density of Three-Dimensional Knitted Fabric)

A test similar to that in FIG. 11 was conducted regarding three kinds of three-dimensional knitted fabrics which were different in density and knitted fabric structure. Samples are the aforesaid sample 1 whose density is the highest among the three kinds (density; 1067 g/m$^2$), a sample 4 whose density is the lowest among the three kinds (density: 325 g/m$^2$), and a sample 5 whose density is between those of the sample 1 and the sample 4 (density: 492 g/m$^2$).

Other properties of the sample 4 and the sample 5 are as follows.

[Sample 4] product number: 49011D (manufactured by Sumie Textile Co., Ltd.), 10 mm thickness
  material:
    ground knitted fabric (warp yarn) . . . polyethylene terephthalate fiber false twisted yarn with 600 decitexes/192 f
    ground knitted fabric (weft yarn) . . . polyethylene terephthalate fiber false twisted yarn with 300 decitexes/72 f
    connecting yarn . . . polyethylene terephthalate monofilament with 800 decitexes/1 f

[Sample 5] product number: AKT65720 (manufactured by Asahi Kasei Corporation), 10 mm thickness Further, regarding a case where the three-dimensional knitted fabric was not disposed ("no net") as a comparative example, transmissibilities of measured sounds to a reference sound were found by disposing sensors at the same positions as above.

Results are illustrated in FIG. 19 to FIG. 22.

Figure 19:
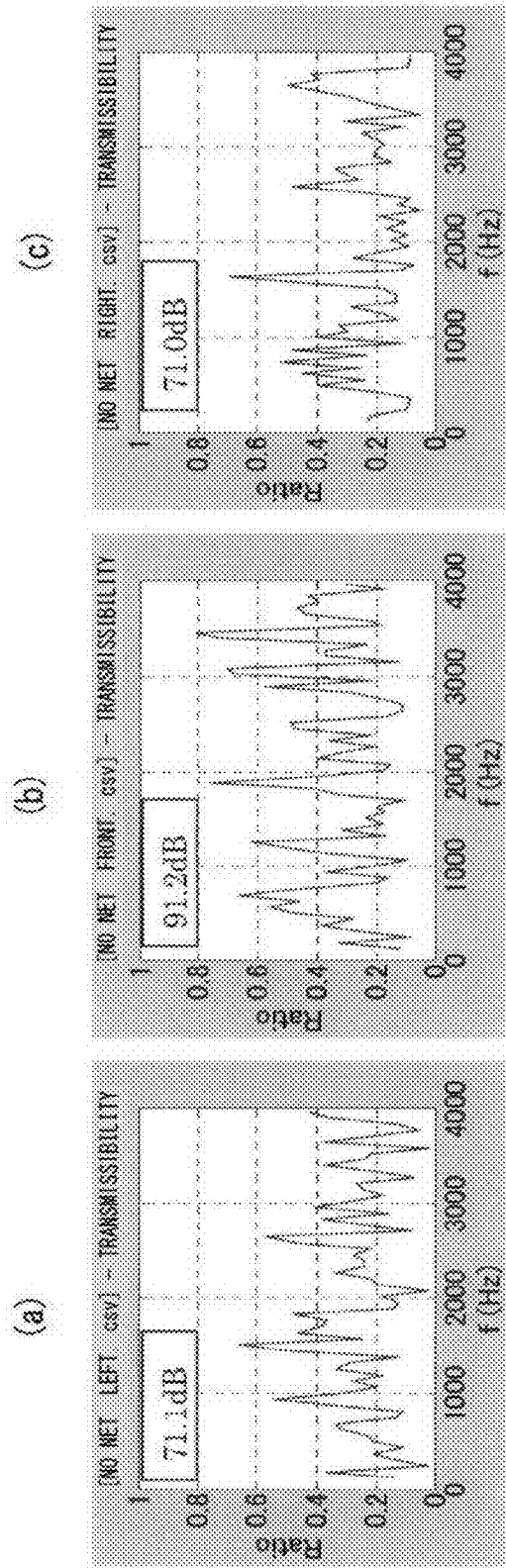
FIG. 19 are charts illustrating test results of a comparative example in a test regarding a sound diffusion characteristic depending on difference in density of the three-dimensional knitted fabric, (a) being a chart illustrating a transmissibility of a measured sound on "the sound source left side", (b) being a chart illustrating a transmissibility of a measured sound on "the sound source front", and (c) being a chart illustrating a transmissibility of a measured sound on "the sound source right side".
Figure 20:
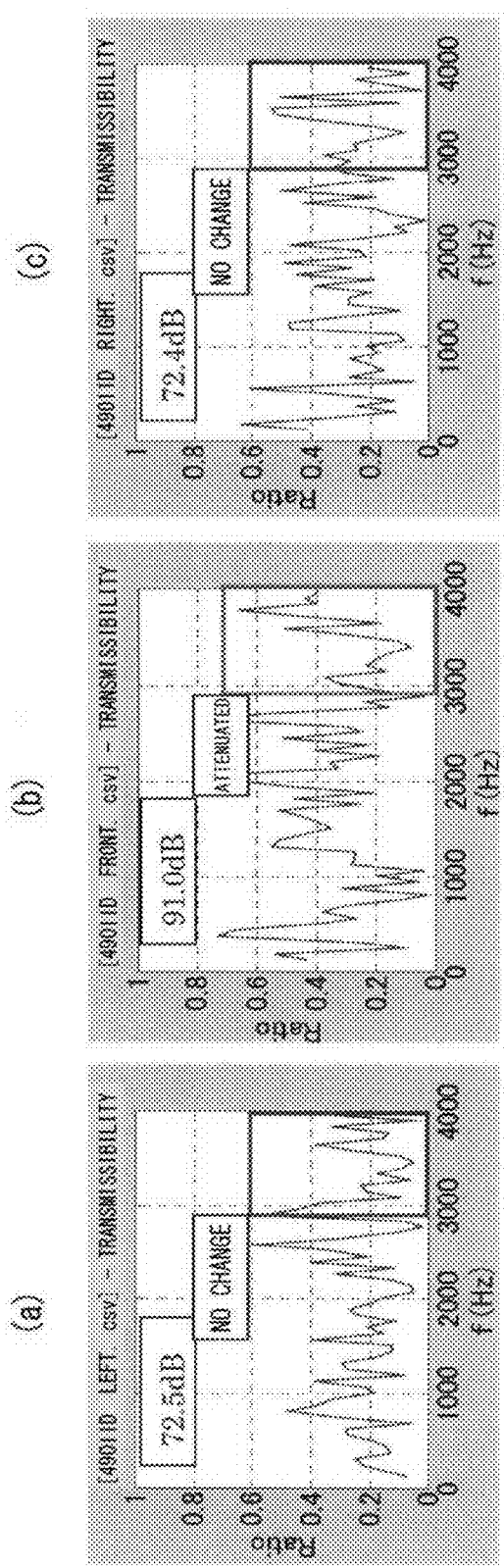
FIG. 20 are charts illustrating test results of a sample 4 in the test regarding the sound diffusion characteristic depending on the difference in density of the three-dimensional knitted fabric, (a) being a chart illustrating a transmissibility of a measured sound on "the sound source left side", (b) being a chart illustrating a transmissibility of a measured sound on "the sound source front", and (c) being a chart illustrating a transmissibility of a measured sound on "the sound source right side".
Figure 21:
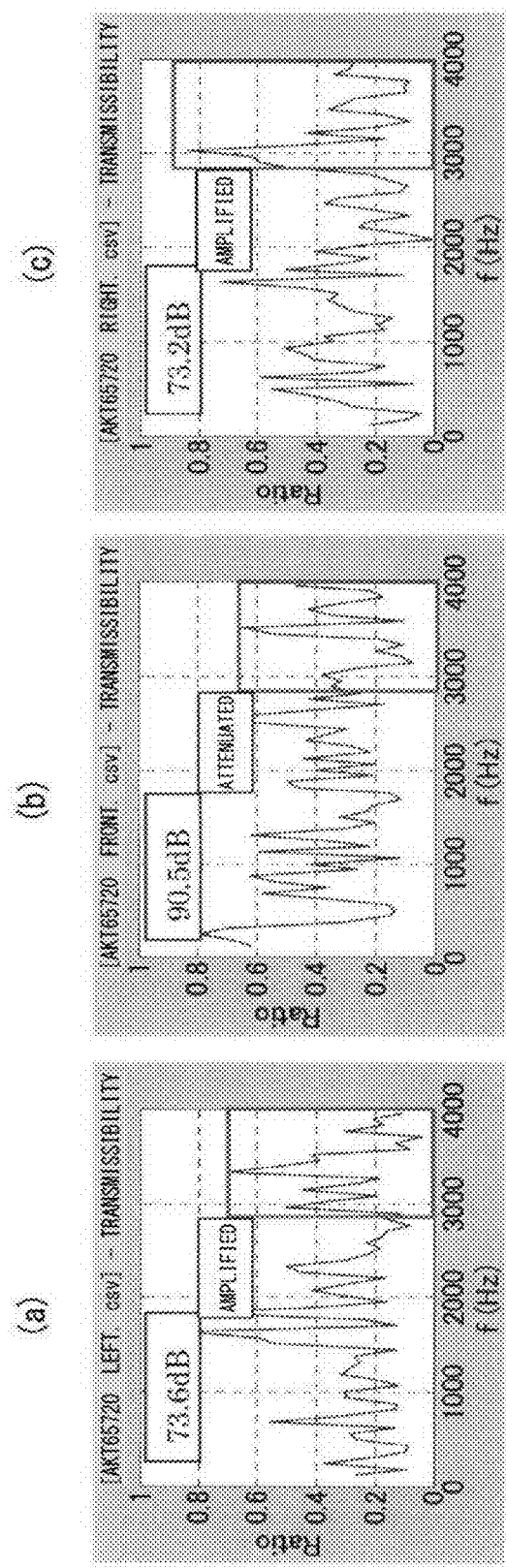
FIG. 21 are charts illustrating test results of a sample 5 in the test regarding the sound diffusion characteristic depending on the difference in density of the three-dimensional knitted fabric, (a) being a chart illustrating a transmissibility of a measured sound on "the sound source left side", (b) being a chart illustrating a transmissibility of a measured sound on "the sound source front", and (c) being a chart illustrating a transmissibility of a measured sound on "the sound source right side".
Figure 22:
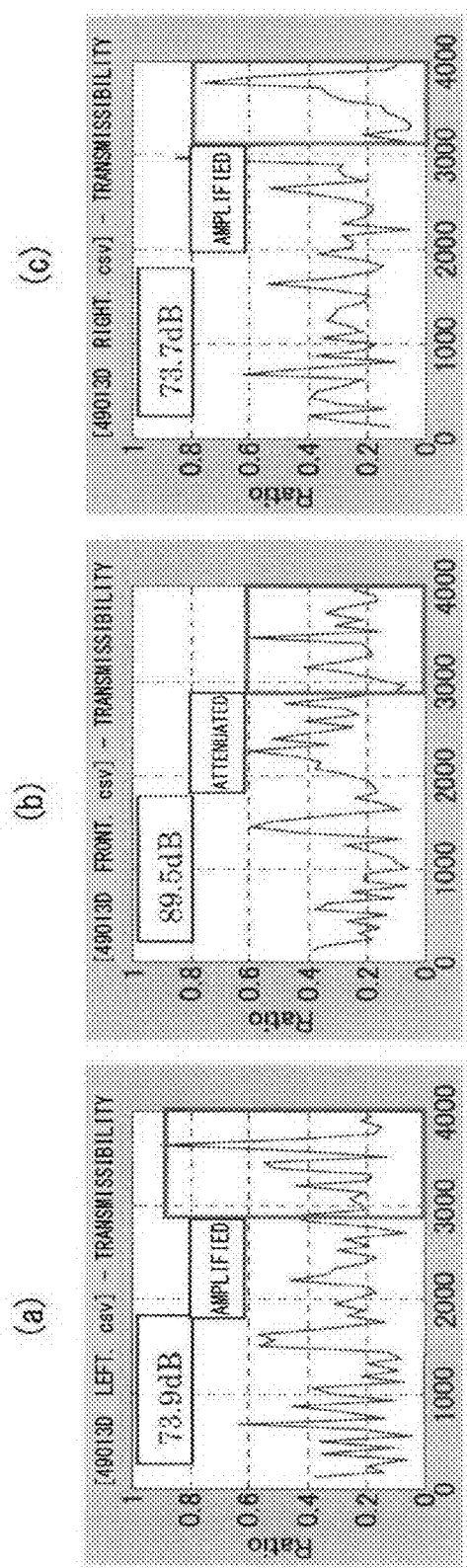
FIG. 22 are charts illustrating test results of a sample 1 in the test regarding the sound diffusion characteristic depending on the difference in density of the three-dimensional knitted fabric, (a) being a chart illustrating a transmissibility of a measured sound on "the sound source left side", (b) being a chart illustrating a transmissibility of a measured sound on "the sound source front", and (c) being a chart illustrating a transmissibility of a measured sound on "the sound source right side".

FIG. 19 illustrate measurement results of "no net" being the comparative example, FIG. 20 illustrate measurement results when the three-dimensional knitted fabric whose product number is "49011D" being the sample 4 is disposed, FIG. 21 illustrate measurement results when the three-dimensional knitted fabric whose product number is "AKT65720" being the sample 5 is disposed, and FIG. 22 illustrate measurement results when the three-dimensional knitted fabric whose product number is "49013D" being the sample 1 is disposed. Further, in FIG. 19 to FIG. 22, (a) is the transmissibility of the measured sound on "the sound source left side", (b) is the transmissibility of the measured sound on "the sound source front", and (c) is the transmissibility of the measured sound on "the sound source right side". Further, in each of the drawings, a sound pressure is also indicated.

First, in the case of the comparative example in FIG. 19, as compared with the transmissibility and the sound pressure on the sound source front, the transmissibilities and the sound pressures on the sound source left side and right side are both lower due to directivity of the sound source. In the sample 4 in FIG. 20, on the sound source front, the transmissibility is lower in 3000 to 4000 Hz than that in the comparative example, due to the attenuation, and further, no increase of the transmissibility was confirmed on both of the sound source left side and right side.

On the other hand, in the sample 5 and the sample 1 in FIG. 21 and FIG. 22, as compared with the comparative example, the transmissibility decreases on the sound source front due to the attenuation by the three-dimensional knitted fabric, but on the sound source left side and right side, the transmissibility increases on the whole, and in particular, the transmissibility of 3000 to 4000 Hz increases. Further, when the sample 5 and the sample 1 are compared, in the sample 1, the increase of the transmissibility of 3000 to 4000 Hz was more prominent.

From the above test results, it has been seen that, even if the three-dimensional knitted fabric is used, the sound diffusion due to a solid sound transmission characteristic is difficult to occur when the density is as low as that of the sample 4, and the density is preferably higher in order to propagate the sound in the surface direction.

(Test Regarding Resonance Characteristic of Three-Dimensional Knitted Fabric)

Figure 23:
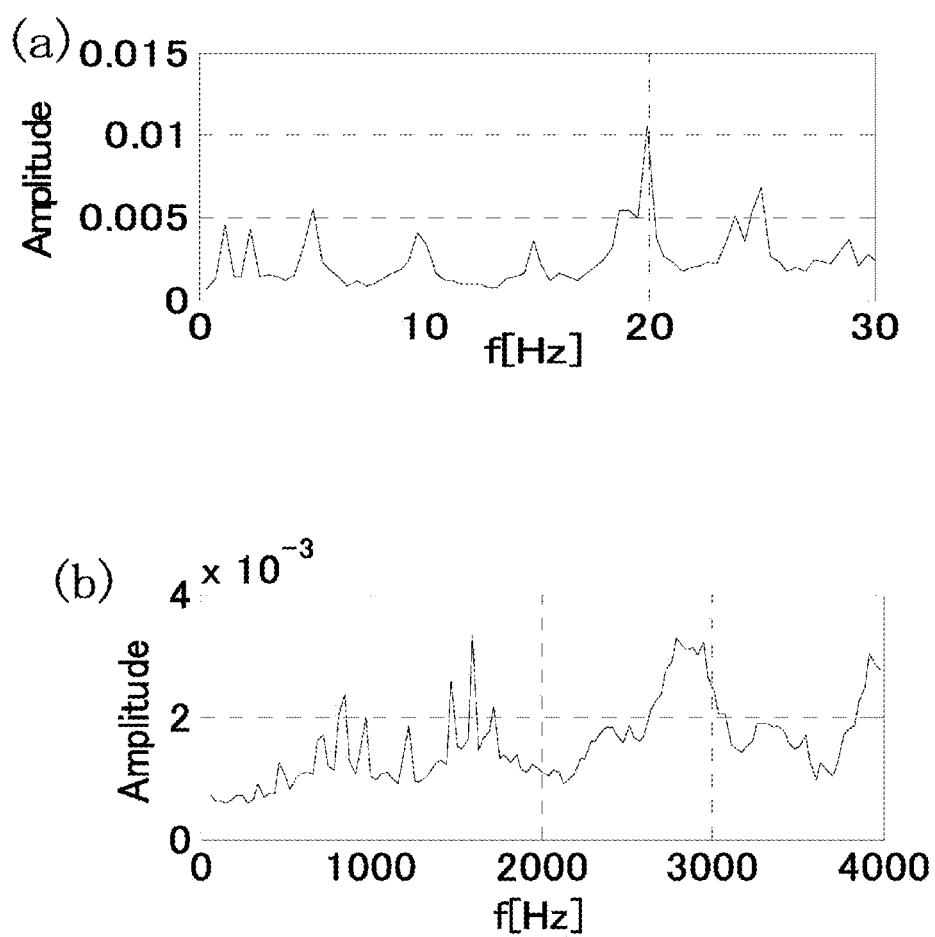
FIG. 23 are charts illustrating test results regarding a resonance characteristic of the three-dimensional knitted fabric, (a) being a chart illustrating a frequency analysis result regarding vibration, and (b) being a chart illustrating a frequency characteristic regarding sound.

A three-dimensional knitted fabric (sample 1) with a 150 mm×60 mm×10 mm size was placed on a vibration stage of a vibrator, an acceleration sensor was disposed on an upper surface of the three-dimensional knitted fabric, vibration with 0 to 30 Hz was applied, and a natural frequency with respect to vibration energy generated by the vibration of the three-dimensional knitted fabric itself was evaluated. FIG. 23(a) illustrates a frequency analysis result thereof.

Further, a natural frequency with respect to energy of a sound propagating in the air was also evaluated. To do this, a sound source, the three-dimensional knitted fabric, and noise meters were disposed in the positional relation illustrated in FIG. 11, white noise (0 to 22050 Hz) was output from the sound source, and a frequency characteristic of a sound having passed through the three-dimensional knitted fabric was found. FIG. 23(b) illustrates its result.

In the frequency analysis result with respect to the vibration in FIG. 23(a), the natural frequency appeared at 20 Hz. Further, from the frequency characteristic of the sound in FIG. 23(b), it has been seen that a resonance phenomenon exists near 3000 Hz and the natural frequency propagating in the air is 880 Hz. That is, when the three-dimensional knitted fabric is brought into motion, the natural frequency appears at 20 Hz, but when the sound is transmitted through a solid, the natural frequency appears at 880 Hz, and in a harmonic component of 3000 Hz to 4000 Hz, the resonance phenomenon is generated and the transmissibility increases.

Incidentally, in the above description, the acoustic device is incorporated in the headrest, but in the acoustic device of the present invention, since the three-dimensional knitted fabric itself functions as the surface sound source, the acoustic device of the present invention is suitable as an acoustic device incorporated in a body support means such as a seat and bedding to which the three-dimensional knitted fabric is applicable as a cushioning layer. Note that it is suitable for use in a narrow region since the three-dimensional knitted fabric itself functions as the surface sound source, and it is especially suitable as an acoustic device-equipped headrest.

EXPLANATION OF REFERENCE SIGNS 1 headrest
10 headrest frame
11, 12 headrest stay
31, 32 speaker unit
40 cushioning layer
41 pad
42 bead foam
43 three-dimensional knitted fabric

The invention claimed is:

1. An acoustic device comprising:
a speaker unit; and
a three-dimensional knitted fabric,
wherein the three-dimensional knitted fabric is provided at a position substantially facing the speaker unit while being given tension in a surface direction, and an output sound of the speaker unit is converted to an acoustic wave of a surface sound source by vibration of yarns constituting a pair of ground knitted fabrics constituting the three-dimensional knitted fabric and by vibration of a connecting yarn extending back and forth between the ground knitted fabrics, and the acoustic wave is propagated to an outside,
wherein a plate-shaped bead foam having a predetermined area is combined with the three-dimensional knitted fabric, the three-dimensional knitted fabric is disposed in a tense state so as to correspond to a hole portion formed at a position of the bead foam, the position substantially facing the speaker unit, and the bead foam, the hole portion, and the three-dimensional knitted fabric serve as a resonance part which vibrates air inside the hole portion to make the output sound of the speaker unit resonate.

2. The acoustic device according to claim 1, wherein the three-dimensional knitted fabric is disposed in a tense state so as to be elongated in the surface direction by a 20% extent or less.

3. The acoustic device according to claim 1, wherein a non-propagating part not allowing the acoustic wave of the surface sound source to propagate is formed in the three-dimensional knitted fabric.

4. The acoustic device according to claim 3, wherein the non-propagating part is formed by a process of bringing the pair of ground knitted fabrics constituting the three-dimensional knitted fabric into proximity to each other.

5. The acoustic device according to claim 1, wherein the three-dimensional knitted fabric also has a function as a cushioning layer that elastically supports a portion of a human body, and is used as part of a body support means.

6. The acoustic device according to claim 5, wherein the body support means is a seat or bedding, and the three-dimensional knitted fabric is used as part of the cushioning layer constituting the seat or the bedding.

7. The acoustic device according to claim 6, wherein, in the seat, the three-dimensional knitted fabric is used in part of the headrest.

8. A headrest in which the acoustic device according to claim 1 is incorporated.

9. The headrest according to claim 8, wherein the three-dimensional knitted fabric also has a function as a cushioning layer that elastically supports a head.

10. The acoustic device according to claim 1, wherein the plate-shaped bead foam includes a flat surface portion shaped as a flat board.

11. The acoustic device according to claim 10, wherein the plate-shaped bead foam includes side surface portions between which the front surface portion is located.

12. An acoustic device comprising:
a speaker unit; and
a three-dimensional knitted fabric including a front surface portion and side surface portions between which the front surface portion is located;
wherein the three-dimensional knitted fabric is provided at a position substantially facing the speaker unit while being given tension in a surface direction, and an output sound of the speaker unit is converted to an acoustic wave of a surface sound source by vibration of yarns constituting a pair of ground knitted fabrics constituting the three-dimensional knitted fabric and by vibration of a connecting yarn extending back and forth between the ground knitted fabrics, and the acoustic wave is propagated to an outside, wherein a plate-shaped bead foam having a predetermined area is combined with the three-dimensional knitted fabric, the three-dimensional knitted fabric is disposed in a tense state, the speaker unit is positioned to substantially face a hole portion of the bead foam and at least one of the side surface portions, and a vibration of the at least one of the side surface portions due to the output sound of the speaker unit is propagated to the front surface portion.

13. An acoustic device comprising:

a speaker unit; and a three-dimensional knitted fabric, wherein the three-dimensional knitted fabric is provided at a position substantially facing the speaker unit while being given tension in a surface direction, and an output sound of the speaker unit is converted to an acoustic wave of a surface sound source by vibration of yarns constituting a pair of ground knitted fabrics constituting the three-dimensional knitted fabric and by vibration of a connecting yarn extending back and forth between the ground knitted fabrics, and the acoustic wave is propagated to an outside, wherein at least one of: fabrics including a knitted fabric, a woven fabric, and a non-woven fabric that are two dimensional or three dimensional; synthetic leather; genuine leather; a synthetic resin film; and a bead foam is combined with the three-dimensional knitted fabric, and wherein a plate-shaped bead foam having a predetermined area is combined with the three-dimensional knitted fabric, the three-dimensional knitted fabric is disposed in a tense state so as to correspond to a hole portion formed at a position of the bead foam, the position substantially facing the speaker unit, and the bead foam, the hole portion, and the three-dimensional knitted fabric serve as a resonance part which vibrates air inside the hole portion to make the output sound of the speaker unit resonate.

\* \* \* \* \*